United States Patent
Lee et al.

(10) Patent No.: US 9,529,497 B2
(45) Date of Patent: Dec. 27, 2016

(54) APPARATUS, METHOD, AND MEDIUM FOR PROVIDING USER INTERFACE FOR FILE TRANSMISSION

(71) Applicant: Samsung Electronics Co., Ltd., Suwon-si (KR)

(72) Inventors: Hyun-jeong Lee, Seoul (KR); Joon-ah Park, Seoul (KR); Wook Chang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 330 days.

(21) Appl. No.: 14/140,816

(22) Filed: Dec. 26, 2013

(65) Prior Publication Data

US 2014/0108957 A1    Apr. 17, 2014

Related U.S. Application Data

(63) Continuation of application No. 13/347,205, filed on Jan. 10, 2012, now Pat. No. 8,638,309, and a
(Continued)

(30) Foreign Application Priority Data

Dec. 13, 2006 (KR) ......................... 10-2006-0127286

(51) Int. Cl.
*G06F 3/0482* (2013.01)
*G06F 17/30* (2006.01)
(Continued)

(52) U.S. Cl.
CPC ............. *G06F 3/0482* (2013.01); *G06F 3/048* (2013.01); *G06F 3/0485* (2013.01);
(Continued)

(58) Field of Classification Search
None
See application file for complete search history.

(56) References Cited

U.S. PATENT DOCUMENTS 6,411,311 B1    6/2002    Rich et al.
6,493,001 B1    12/2002   Takagi et al.
(Continued)

FOREIGN PATENT DOCUMENTS

JP    11-024874     1/1999
JP    2004-172849   6/2004
(Continued)

OTHER PUBLICATIONS

Japanese Office Action issued Mar. 10, 2015 in Japanese Patent Application No. 2013-238083.
(Continued)

*Primary Examiner* — Kenneth B Lee, Jr.
(74) *Attorney, Agent, or Firm* — Staas & Halsey LLP

(57) ABSTRACT

Disclosed are an apparatus, method, and medium for providing a user interface for file transmission. The apparatus includes a motion perception (recognition) module perceiving (recognizing) a motion input to the user interface and identifying a position of the perceived (recognized) motion, a motion execution module executing a motion corresponding to the perceived motion and the identified position of the perceived motion and modifying components of the user interface according to the executed motion, and a communication module transmitting a file to a transmission target based on the perceived motion and the identified position of the perceived motion. The components of the user interface may include a file list region, a transmission target region, and an execution region.

19 Claims, 21 Drawing Sheets

Related U.S. Application Data continuation of application No. 11/898,656, filed on Sep. 13, 2007, now Pat. No. 8,111,244.

(51) Int. Cl.
    *G06F 3/048*     (2013.01)
    *G06F 3/0481*     (2013.01)
    *G06F 3/0485*     (2013.01)
    *G06F 3/0486*     (2013.01)
    *G06F 3/0488*     (2013.01)
    *H04L 29/08*     (2006.01)

(52) U.S. Cl.
    CPC .......... *G06F 3/0486* (2013.01); *G06F 3/0488* (2013.01); *G06F 3/04817* (2013.01); *G06F 17/30017* (2013.01); *H04L 67/06* (2013.01)

(56) References Cited

U.S. PATENT DOCUMENTS

| | | | |
|---|---|---|---|
| 6,590,568 B1 | 7/2003 | Astala et al. | |
| 7,568,167 B2 | 7/2009 | Van Dok et al. | |
| 8,638,309 B2 * | 1/2014 | Lee .................. | G06F 17/30017 345/173 |
| 2005/0235037 A1 | 10/2005 | Tropartz | |

FOREIGN PATENT DOCUMENTS

| | | |
|---|---|---|
| JP | 2005-018182 | 1/2005 |
| JP | 2006-17884 | 7/2006 |
| KR | 10-2000-0012335 | 3/2000 |
| KR | 10-2002-0038177 | 5/2002 |
| KR | 10-2002-0082510 | 10/2002 |
| KR | 10-2005-0039560 | 4/2005 |

OTHER PUBLICATIONS

Chinese Office Action dated Mar. 29, 2010 in Chinese Patent Application No. 200710193893.6.

"Plus! Party Mode: Mix Audio and Video in Playlists", Northrup et al., Internet Citation: XP002292599 [retrieved on Jun. 23, 2004].

"Advanced Playlist Builder for Windows 95/98/NT/2000", Internet Citation: XP002291783 [retrieved on Aug. 9, 2004].

European Search Report, dated Mar. 26, 2009, from European Patent Application No. 07123043.7.

Korean Office Action issued Jun. 12, 2013 in corresponding Korean Patent Application No. 10-2006-0127286.

Japanese Office Action for related Japanese Patent Application No. 2007-314936, issued on Sep. 4, 2012.

98/Me/2000/XP, pp. 1-5 and 6E.

Office Action mailed Sep. 24, 2010 in U.S. Parent U.S. Appl. No. 11/898,656.

Office Action mailed Mar. 17, 2011 in U.S. Parent U.S. Appl. No. 11/898,656.

Notice of Allowance mailed Sep. 27, 2011 in U.S. Parent U.S. Appl. No. 11/898,656.

US Notice of Allowance issued Sep. 20, 2013 in U.S. Appl. No. 13/347,205.

US Office Action issued Mar. 18, 2013 in U.S. Appl. No. 13/347,205.

USPTO Communication issued Feb. 19, 2013 in U.S. Appl. No. 13/347,205.

US Office Action issued Aug. 24, 2012 in U.S. Appl. No. 13/347,205.

U.S. Appl. No. 13/347,205, filed Jan. 10, 2012, Hyun-jeong Lee, et al.

U.S. Appl. No. 11/898,656, (Now issued as U.S. Pat. No. 8,111,244), filed Sep. 13, 2007, Hyun-jeong Lee, et al.

\* cited by examiner

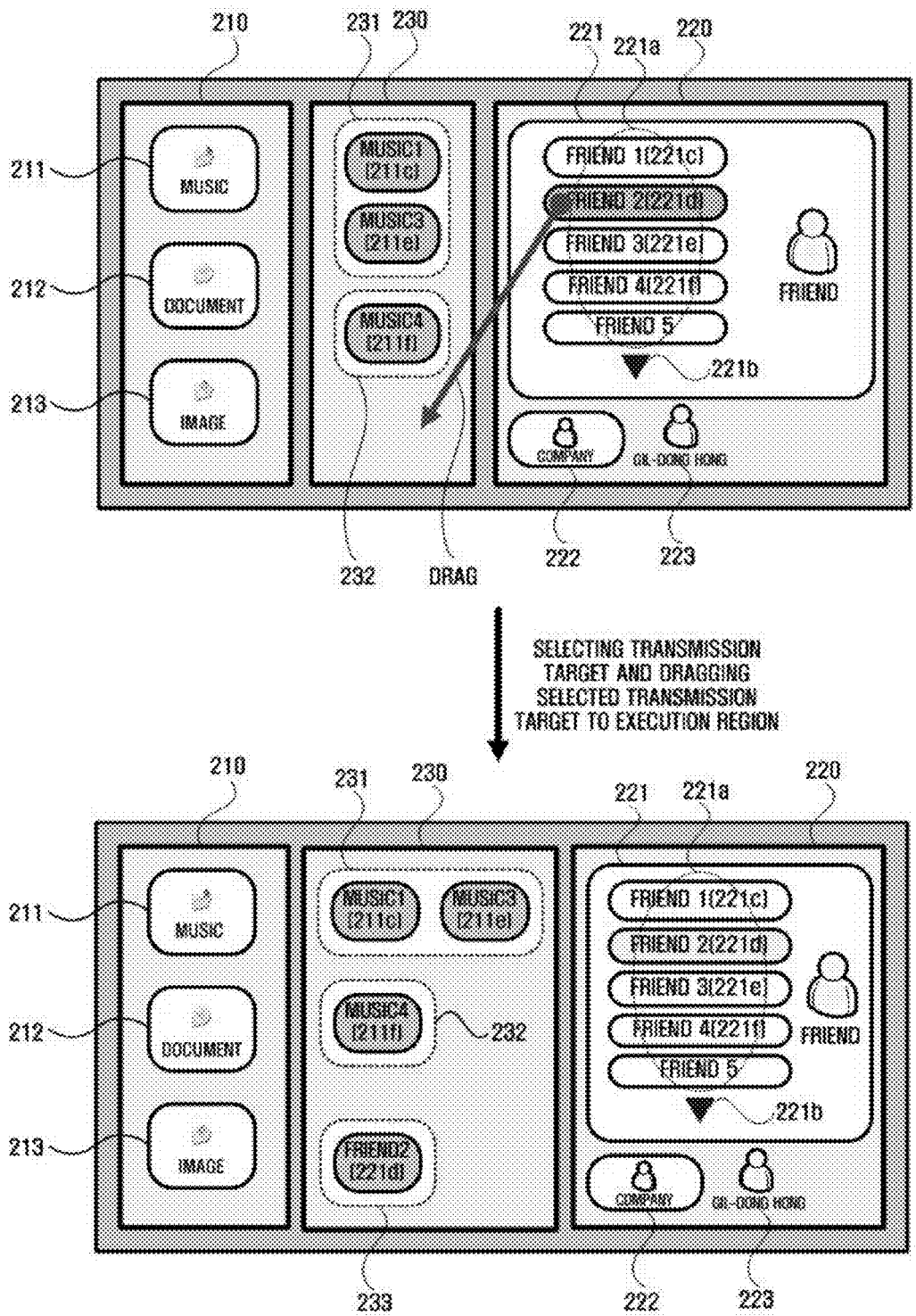

FIG. 11A
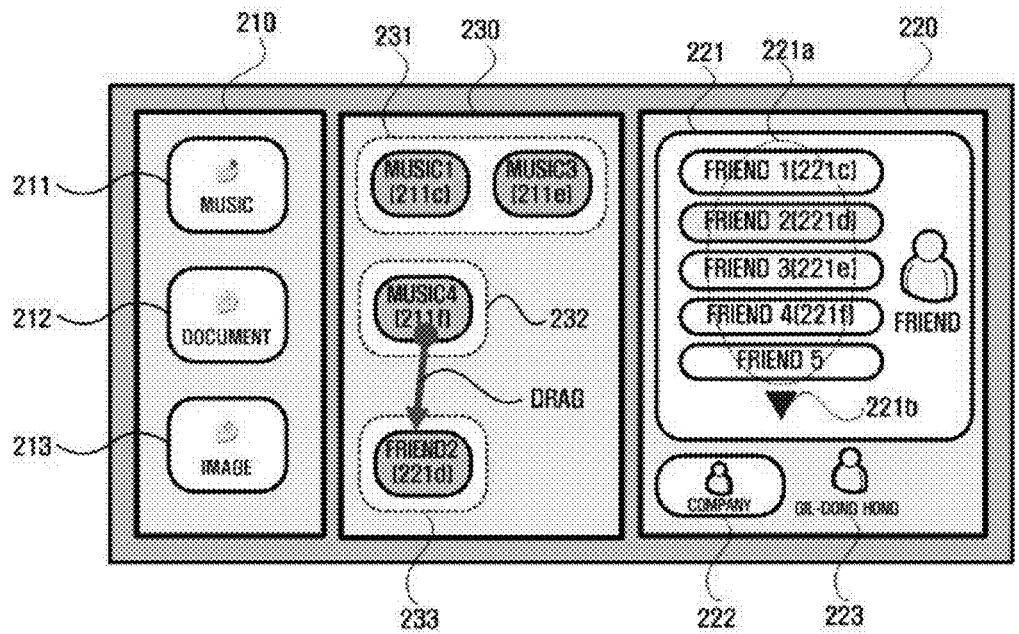
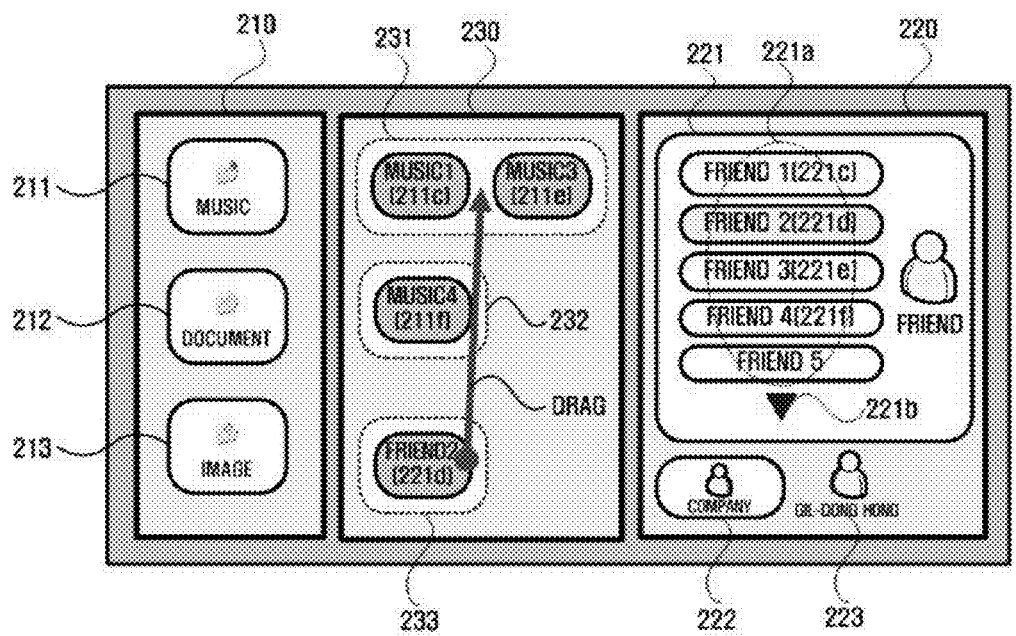

APPARATUS, METHOD, AND MEDIUM FOR PROVIDING USER INTERFACE FOR FILE TRANSMISSION

CROSS-REFERENCE TO RELATED APPLICATIONS

This application is a continuation application of U.S. application Ser. No. 13/347,205, filed Jan. 10, 2012, which is a continuation application of Ser. No. 11/898,656 filed on Sep. 13, 2007 (U.S. Pat. No. 8,111,244), which claims the priority benefit of Korean Patent Application No. 10-2006-0127286 filed on Dec. 13, 2006 in the Korean Intellectual Property Office, the disclosures of which are incorporated herein by reference.

BACKGROUND

1. Field

The present invention relates to an apparatus, method, and medium for providing a user interface for file transmission, and more particularly, to an apparatus, method, and medium for providing a user interface for file transmission, the apparatus, method, and medium capable of dividing a screen of a mobile device, which stores files of predetermined sizes, can communicate data with other devices, and uses a touch screen, into a selection region and an execution region, selecting a file to transmit and a transmission target in the selection region, moving the selected file and transmission target to the execution region, and transmitting the selected file to the selected transmission target, thereby preventing a malfunction due to a mistake made while touch and drag motions are performed and transmitting one or more files to one or more transmission targets.

2. Description of the Related Art

Generally, in order to transmit a file of a predetermined size from a mobile device, which can communicate data with other devices, to another device or user, a transmission target may be selected after a file to be transmitted is selected, or a file to be transmitted may be selected after a transmission target is selected. Then, the selected file may be transmitted to the selected transmission target.

While selecting a transmission target after selecting a file to transmit, a user may wish to add another file to previously selected files or remove any one of the previously selected files. In this case, the user has to return to a previous screen, i.e., a File Select screen, reselect a file on the previous screen, come back to a Transmission Target Selection screen, and then reselect a transmission target on the Transmission Target Select screen.

Similarly, while selecting a file to transmit after selecting a transmission target, the user may wish to add another transmission target to previously selected transmission targets or remove any one of the previously selected transmission targets. In this case, the user has to go through the inconvenient process of reselecting a transmission target on a previous screen and then reselecting a file to transmit as described above.

In addition, due to the limitations of mobile devices which have to represent and execute various functions on small screens, it is difficult to provide intuitive interfaces to users. If file transmission described above is performed with touch and drag motions using a user's finger or an object, such as a stylus pen, an undesired operation may be carried out immediately after a mistake is made during the touch motion.

Korean Patent Publication No. 2002-0038177 suggests "System Control Method Using Touch Screen." This conventional art suggests a method of replacing a large number of user input keys with touch and drag motions in order to overcome the limitations of mobile devices which have to input and execute various functions on small screens. However, the conventional art fails to solve the problems mentioned above.

SUMMARY

According to an aspect of the present invention, the present invention provides an apparatus and method for providing a user interface for file transmission, the apparatus and method capable of preventing a malfunction due to a mistake made while touch and drag motions are performed by providing intuitive screen configuration to a user and capable of easily and conveniently transmitting one or more files to one or more transmission targets.

According to an aspect of the present invention, there is provided an apparatus for providing a user interface for file transmission. The apparatus includes a motion perception (recognition) module to recognize a motion input to the user interface and to identify a position of the (recognized) motion; a motion execution module to execute a motion corresponding to the recognized motion and the identified position of the recognized motion and modifying components of the user interface according to the executed motion; and a communication module to transmit a file to a transmission target based on the recognized motion and the identified position of the recognized motion.

The components of the user interface include a file list region where a file to be transmitted is selected and the selected file is moved; a transmission target region where a transmission target to which the selected file is to be transmitted and the selected transmission target is moved; and an execution region to which the selected file and the selected transmission target are moved and in which the selected file is transmitted to the selected transmission target.

According to another aspect of the present invention, there is provided a file transmission method including a file selection operation in which a file selected according to a motion input to a user interface and a position of the input motion is moved to a first region; a transmission target selection operation in which a transmission target selected according to a motion input to the user interface and a position of the input motion is moved to the first region; and an execution operation in which the file is transmitted to the transmission target.

The first region denotes the execution region which is one of the components of the user interface described above.

According to another aspect of the present invention, there is provided an apparatus for providing a user interface for file transmission, the apparatus including a motion recognition module to recognize a motion input to the user interface and to identity a position of the recognized motion; a motion execution module to execute a motion corresponding to the recognized motion and the identified position of the recognized motion and modifying components of the user interface according to the executed motion; and a communication module to transmit a file to a transmission target based on the recognized motion and the identified position of the recognized motion, wherein the components of the user interface include a file list region from which a plurality of files to be transmitted are selected; a transmission target region from which at least one transmission target is selected; and an execution region to which the selected files and the at least one selected transmission target are moved and in which the selected files are transmitted to the at least one selected transmission target.

According to another aspect of the present invention, there is provided a method for transmitting a file including selecting a plurality of files according to a motion input to a user interface and a position of the input motion and moving the selected files to a first region; selecting at least one transmission target according to a motion input to the user interface and a position of the input motion and moving the at least one selected transmission target to the first region; and transmitting the selected files to the at least one transmission target.

According to another aspect of the present invention, there is provided a method for transmitting a file including selecting a file according to a motion input to a user interface and a position of the input motion and moving the selected file to a first region; selecting a transmission target according to a motion input to the user interface and a position of the input motion and moving the selected transmission target to the first region; and transmitting the file to the transmission target.

According to another aspect of the present invention, there is provided at least one computer readable medium storing computer readable instructions to implement methods of the present invention.

BRIEF DESCRIPTION OF THE DRAWINGS

These and/or other aspects and advantages will become apparent and more readily appreciated from the following description of the example embodiments, taken in conjunction with the accompanying drawings of which

FIG. 10 illustrates a method of dragging a transmission target to the execution region according to an exemplary embodiment of the present invention;

FIGS. 11A through 11C illustrate a method of transmitting a file to a transmission target in the execution region according to an exemplary embodiment of the present invention;

DETAILED DESCRIPTION

Figure 1:
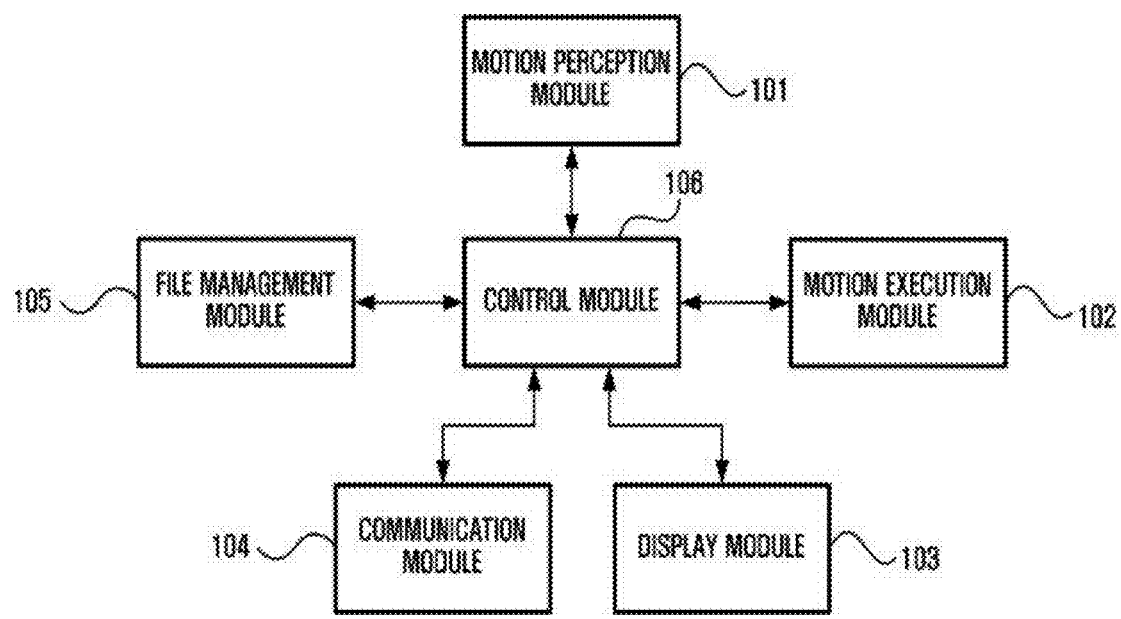
FIG. 1 is a block diagram of an apparatus for providing a user interface for file transmission according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The invention may, however, be embodied in many different forms and should not be construed as being limited to the embodiments set forth herein; rather, these exemplary embodiments are provided so that this disclosure will be thorough and complete, and will fully convey the concept of the invention to those or ordinary skill in the art.

It will be understood that each block of the flowchart illustrations, and combinations of blocks in the flowchart illustrations, can be implemented by computer program instructions.

These computer program instructions can be provided to one or more processors of a general purpose computer, special purpose computer, or other programmable data processing apparatus, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture that implements the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s).

In some alternative implementations or embodiments, the functions noted in the blocks may occur out of the order. For example, two blocks shown in succession may in fact be executed substantially concurrently or the blocks may sometimes be executed in the reverse order, depending upon the functionality involved.

The apparatus, method, and medium for providing a user interface according to exemplary embodiments of the present invention may be applied to small mobile devices such as personal digital assistants (PDAs), portable media players (PMPs), MP3 players and mobile phones. Therefore, these small mobile devices may be manipulated with touch, drag and scroll motions using a user's finger or an object, such as a stylus pen. Also, the apparatus, method, and medium may be applied to personal computers (PCs). Therefore, the PCs may be manipulated with click, drag and scroll motions using an input device, such as a mouse.

For convenience of description, a case where the apparatus, method, and medium are applied to a small mobile device and thus the small mobile device is manipulated with touch, drag and scroll motions using a user's finger or an object, such as a stylus pen, will be described in exemplary embodiments of the present invention.

FIG. 1 is a block diagram of an apparatus 100 for providing a user interface for file transmission according to an exemplary embodiment of the present invention.

Referring to FIG. 1, the apparatus 100 includes a motion perception module 101, a motion execution module 102, a display module 103, a communication module 104, a file management module 105, and a control module 106. The motion perception module 101 perceives a motion input to the user interface and identifies a position of the perceived motion. The motion execution module 102 executes a motion corresponding to the perceived motion and the identified position of the perceived motion and modifies components of the user interface according to the executed motion. The display module 103 displays the components of the user interface and the modified components of the user interface. The communication module 104 transmits a file to a transmission target based on the perceived motion and the identified position of the perceived motion. The file management module 105 manages stored files and file groups. The control module 106 controls each module.

The components of the user interface will be described in detail later with reference to FIG. 2.

The motion perception module (motion recognition module) 101 of the apparatus 100 perceives (recognizes) a touch motion input to the user interface and identifies a position of the touch motion.

Here, the 'touch motion' denotes a motion of touching a touch screen using a user's finger or an object such as a stylus pen. That is, the 'touch motion' denotes motions, such as touching, dragging and scrolling, and is not limited to simple touching.

In addition, the 'position of the touch motion' denotes a position at which a user's finger or an object, such as a stylus pen, touches the touch screen in order to select a file to transmit and a transmission target and transmit the selected file to the selected transmission target.

In order to perceive a touch position of an object, the motion perception module 101 may include any one of a single-point touch sensing screen and a multi-point touch sensing screen. In the present exemplary embodiment, a case where the motion perception module 101 includes a multi-point touch sensing screen and thus perceives (recognizes) one or more touch positions will be described.

In another exemplary embodiment of the present invention, the apparatus 100 may be applied to a PC. Hence, the motion perception module 101 may perceive (recognize) a motion, such as a click, scroll or drag motion, input to an input device, such as a mouse, and identify a position of the perceived (recognized) motion.

Hereinafter, a case where a touch screen is used as an exemplary embodiment of the apparatus 100 will be described. In an exemplary embodiment of the present invention, it is assumed that a mobile device for transmitting a file is manipulated using a user's finger.

The motion execution module 102 executes a motion corresponding to the touch motion described above and the position of the touch motion and modifies the components of the user interface according to the executed motion.

For example, a folder may include one or more files, and when the folder is touched, it may be opened, and the files included in the folder may be displayed in the form of a list. In this case, if the motion perception module 101 perceives that an object has touched the folder and that the position of the touch corresponds to the folder, the motion execution module 102 opens the folder, which is a motion corresponding to the touch of the object on the folder, and modifies the files included in the folder into a list.

Here, the 'components of the user interface' include a file list region, a transmission target region and an execution region, and denote one or more objects which can be displayed on the user interface, such as files and a file list, transmission targets and a transmission target list, and buttons or icons.

A file list sequentially lists objects, such as music, moving-image and text files, and files may respectively be included in a plurality of corresponding file groups and sequentially listed accordingly.

In addition, a transmission target list sequentially lists objects, such as telephone numbers and e-mail addresses, and transmission targets may also be respectively included in a plurality of corresponding groups and sequentially listed accordingly.

In the present invention, the 'objects displayed on the user interface' are not limited to the files and file lists, the transmission targets and transmission target lists, and the buttons or icons. It is obvious that any object, which can execute a corresponding function or can be moved in response to a touch motion of a user, can be included in the components of the user interface according to the present exemplary embodiment, i.e., the objects displayed on the user interface.

Figure 2:
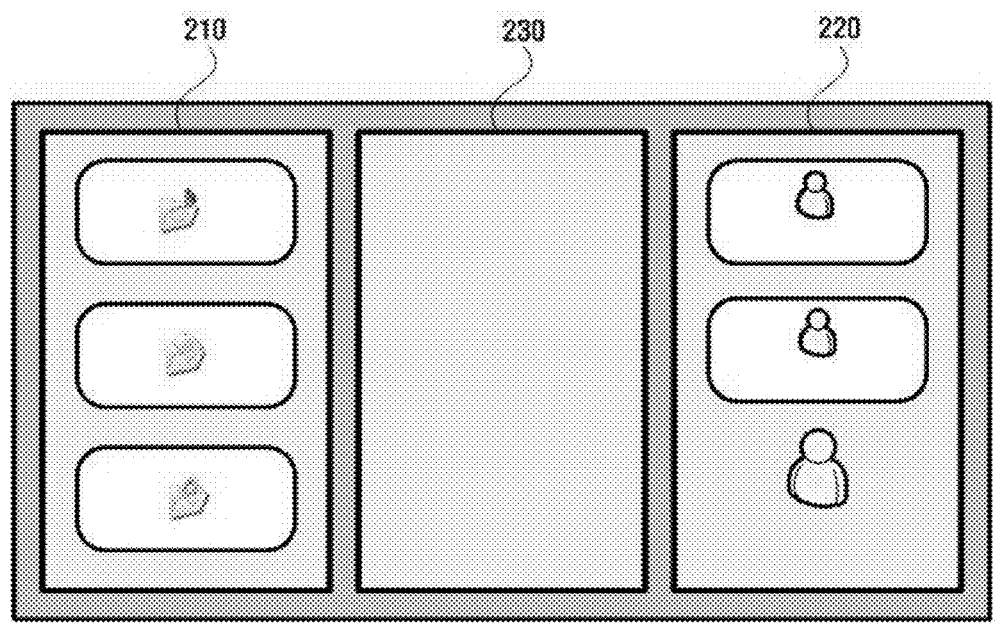
FIG. 2 illustrates components of a user interface for file transmission according to an exemplary embodiment of the present invention.

FIG. 2 illustrates components of a user interface for file transmission according to an exemplary embodiment of the present invention.

The components of the user interface include a file list region 210, a transmission target region 220, and an execution region 230. In the file list region 210, a file that is to be transmitted is selected, and the selected file is moved to the execution region 230. In the transmission target region 220, a transmission target, to which the selected file is to be transmitted, is selected and the selected transmission target is moved to the execution region 230. In the execution region 230 to which the selected file and the selected transmission target have been moved, the selected file is transmitted to the selected transmission target.

A list of files stored in a predetermined repository are displayed in the file list region 210. A user touches and thus selects a file to transmit in the file list region 210 and moves the selected file to the execution region 230.

In the present exemplary embodiment, it is assumed that the predetermined repository stores one or more music, text and image files and that the music, text and image files are respectively included in a music file group 211, a text file group 212, and an image file group 213 by file management module 105 managing stored files and file groups. In addition, it is assumed that the music file group 211, the text file group 212, and the image file group 213 are displayed in the file list region 210 in the form of folders and that a user intends to transmit a music file to a transmission target.

Figure 3A:
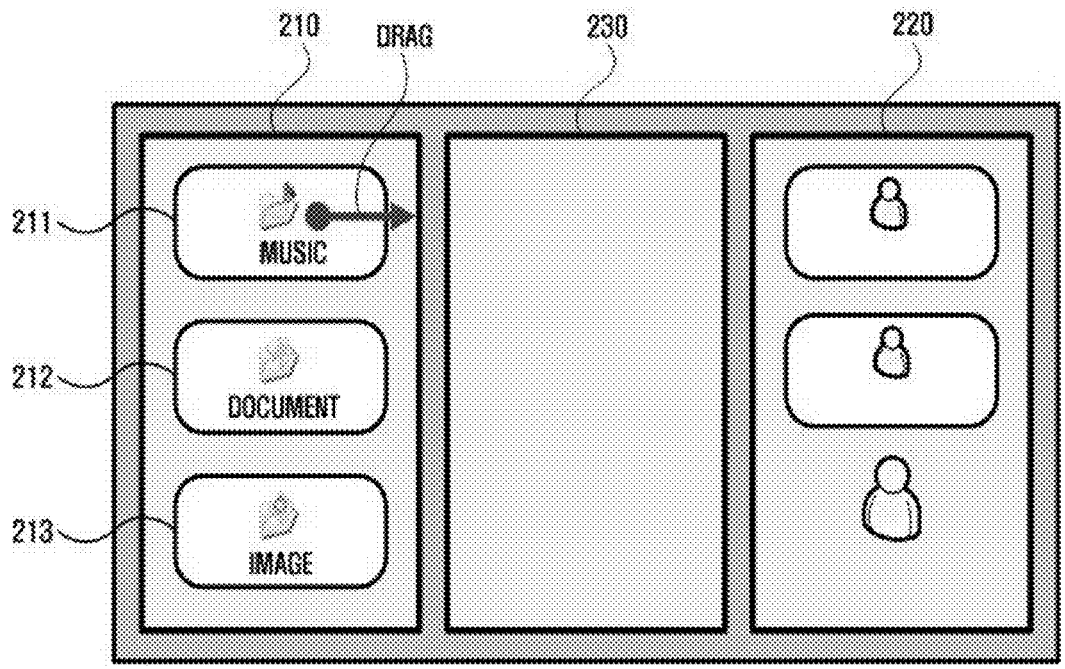
FIGS. 3A through 3C illustrate touch motions in a file list region according to an exemplary embodiment of the present invention.
Figure 3:
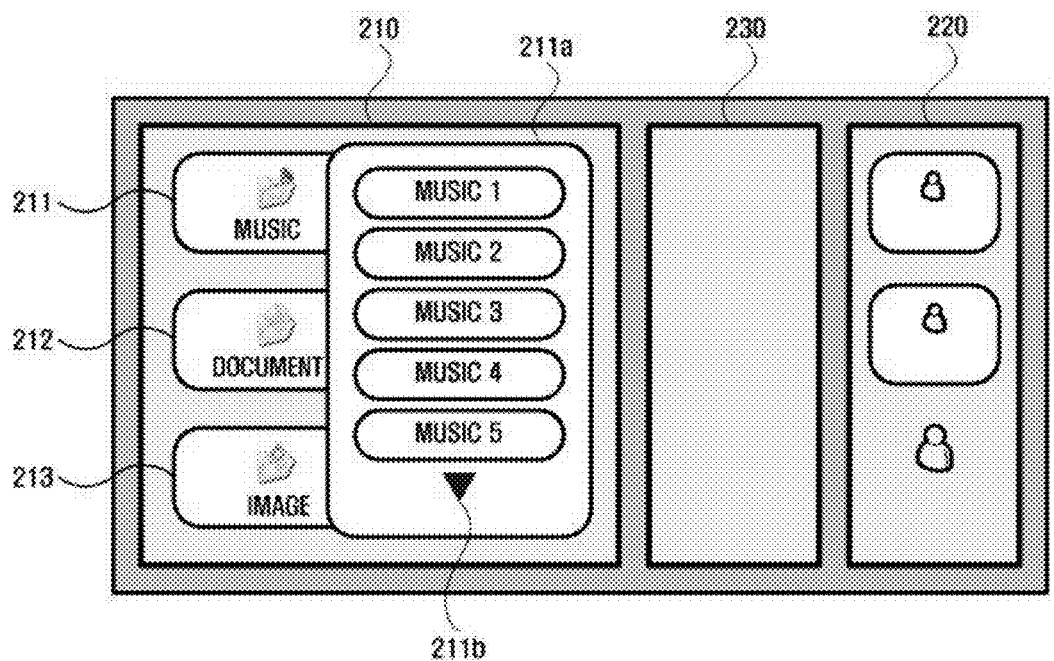
Figure 3:
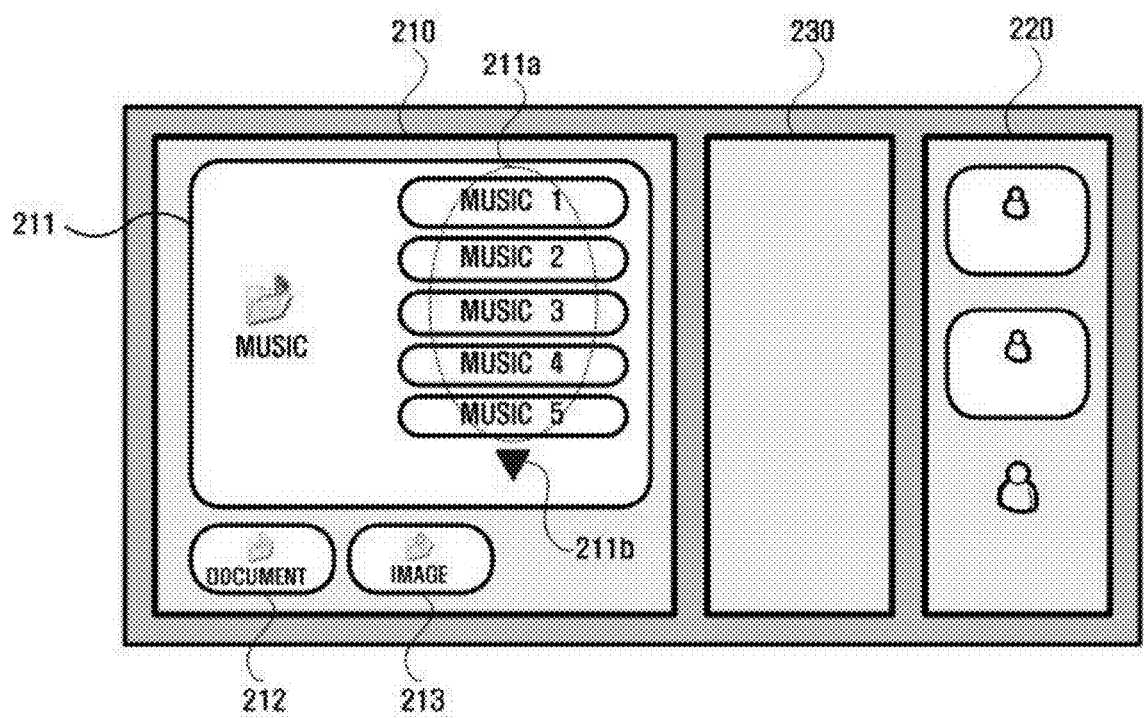

FIGS. 3A through 3C illustrate touch motions in the file list region 210 according to an exemplary embodiment of the present invention.

As described above, if a plurality of music files are included in a music file group 211 and displayed accordingly, a user performs manipulations within a file group region in order to view the music files in the music file group 211. As illustrated in FIG. 3A, the user drags the music file group 211 displayed in the file list region 210 to the right, thereby selecting the music file group 211.

In this case, a direction in which the user drags the music file group 211 to view the music files included in the music file group 211 is not limited to the present exemplary embodiment. However, a function of each motion may have a consistent direction.

The motion perception module 101 perceives a drag motion input by the user to the user interface, identifies a position of the input drag motion, and transmits information regarding an object, which corresponds to the identified position, to the motion execution module 102.

In the 'information regarding an object, which corresponds to the identified position,' the object corresponding to the identified position is the music file group 211, and the information regarding the object denotes information such as the number of music files included in the music file group 211 and the size of each music file.

The motion execution module 102 may pop up a plurality of music files 211a, which are included in the music file group 211, on the file list region 210 as illustrated in FIG. 3B or display the music files 211a in the form of a list in the file list region 210 of the display module 103 as illustrated in FIG. 3C.

Hereinafter, popping up a plurality of files, which are included in a file group, on the file list region 210 in the form of a list or displaying the files in the file list region 210 in the form of a list will be expressed as 'opening a file group.' In addition, removing a plurality of files included in an 'open file group' from the file list region 210 will be expressed as 'closing a file group.'

If not all of the music files included in the music file group 211 can be displayed in the form of a list, the motion execution module 102 displays, for example, a screen component 211b in the file list region 210 of the display module 103. Therefore, if the user touches the screen component 211b, the user can view music files which could not be displayed.

The motion execution module 102 adjusts the file list region 210 to become larger than other regions so that the user can intuitively perceive that a job is currently being executed in the file list region 210.

If the user desires to transmit only one of the music files 211a displayed in the file list region 210 in the form of a list, the user touches and thus selects a desired file.

Figure 4A:
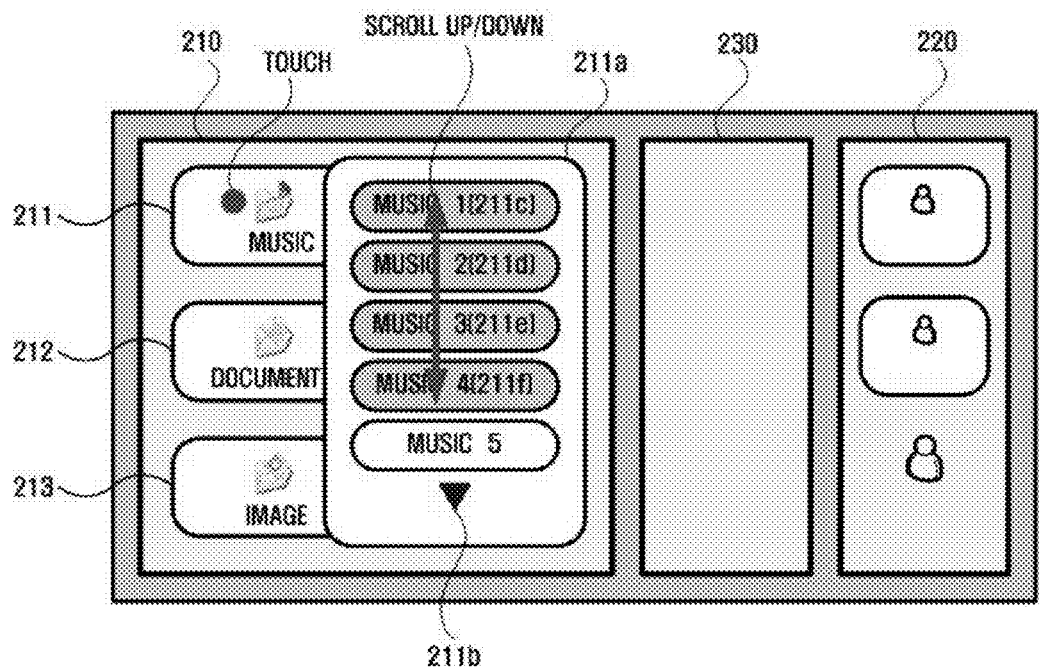
FIGS. 4A through 4C illustrate a method of selecting one or more files with touch and scroll motions according to an exemplary embodiment of the present invention.
Figure 4:
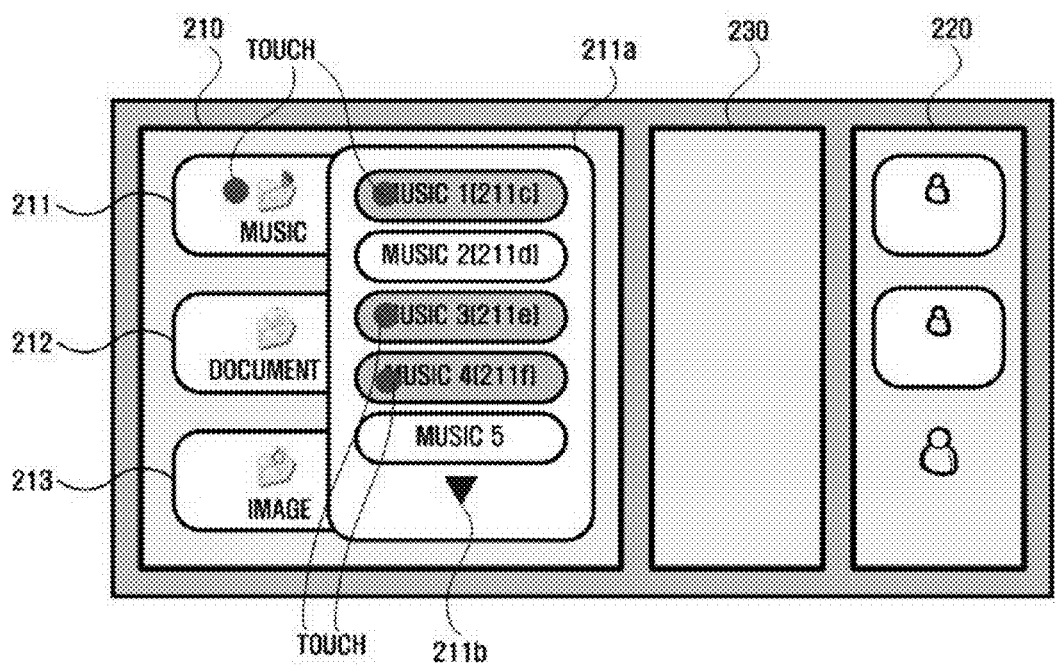
Figure 4:
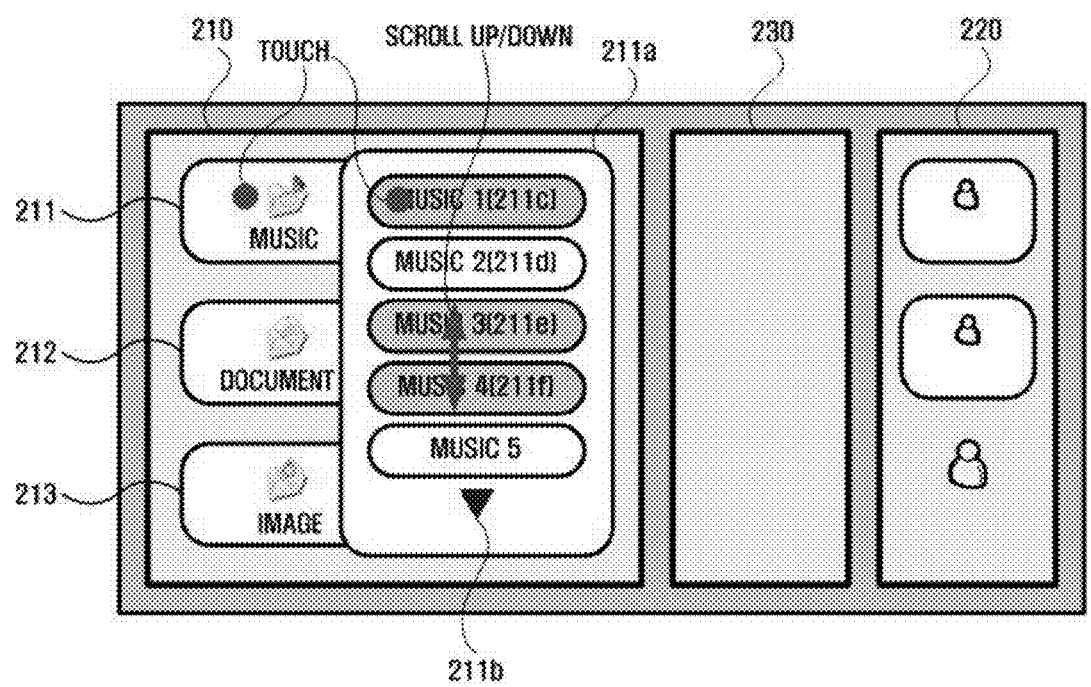

FIGS. 4A through 4C illustrate a method of selecting one or more files with touch and scroll motions according to an exemplary embodiment of the present invention.

In order to select one or more files, an apparatus to which a multi-point touch sensing screen is applied is required. As described above with reference to FIG. 1, it is assumed that a multi-point touch sensing screen is applied to the apparatus 100 in order to select one or more files.

FIG. 4A illustrates a method of selecting one or more consecutive files with touch and scroll motions according to an exemplary embodiment of the present invention.

As in FIG. 3B, it is assumed that a plurality of music files 211a included in a music file group 211 are popped up on the file list region 210 in the form of a list and that a user selects four consecutive music files, e.g., first through fourth music files 211c through 211f.

In order to select one or more consecutive music files, i.e., the first through fourth music files 211c through 211f, the user touches an uppermost or lowermost one (e.g., the first music file 211c) of the consecutive files with the right hand while touching a corresponding file group, i.e., the music file group 211, with the left hand. Then, the user scrolls from the first music file 211c to a lowermost or uppermost one of the consecutive files, thereby selecting the consecutive files.

FIGS. 4B and 4C illustrate a method of selecting one or more inconsecutive files with touch and scroll motions according to an exemplary embodiment of the present invention.

As in FIG. 3B, it is assumed that a plurality of music files 211a included in a music file group 211 are popped up on the file list region 210 in the form of a list and that a user selects one or more inconsecutive music files, e.g., a first music file 211c, a third music file 211e, and a fourth music file 211f.

In order to select one or more inconsecutive music files, i.e., the first music file 211c, the third music file 211e and the fourth music file 211f, the user may touch each of the inconsecutive music files with the right hand while touching a corresponding file group, i.e., the music file group 211, with the left hand as illustrated in FIG. 4B. Alternatively, as illustrated in FIG. 4C, the user may touch the first music file 211c. Then, since the third and fourth music files 211e and 211f are consecutive files, the user may select the third and fourth music files 211e and 211f by scrolling them using a scrolling method described above with reference to FIG. 4A. In this way, the user can select the inconsecutive files.

Here, the order of the touch and scroll motions is not limited to the present exemplary embodiment. That is, after consecutive files are scrolled and thus selected, the remaining files may be touched and thus selected.

Figure 5:
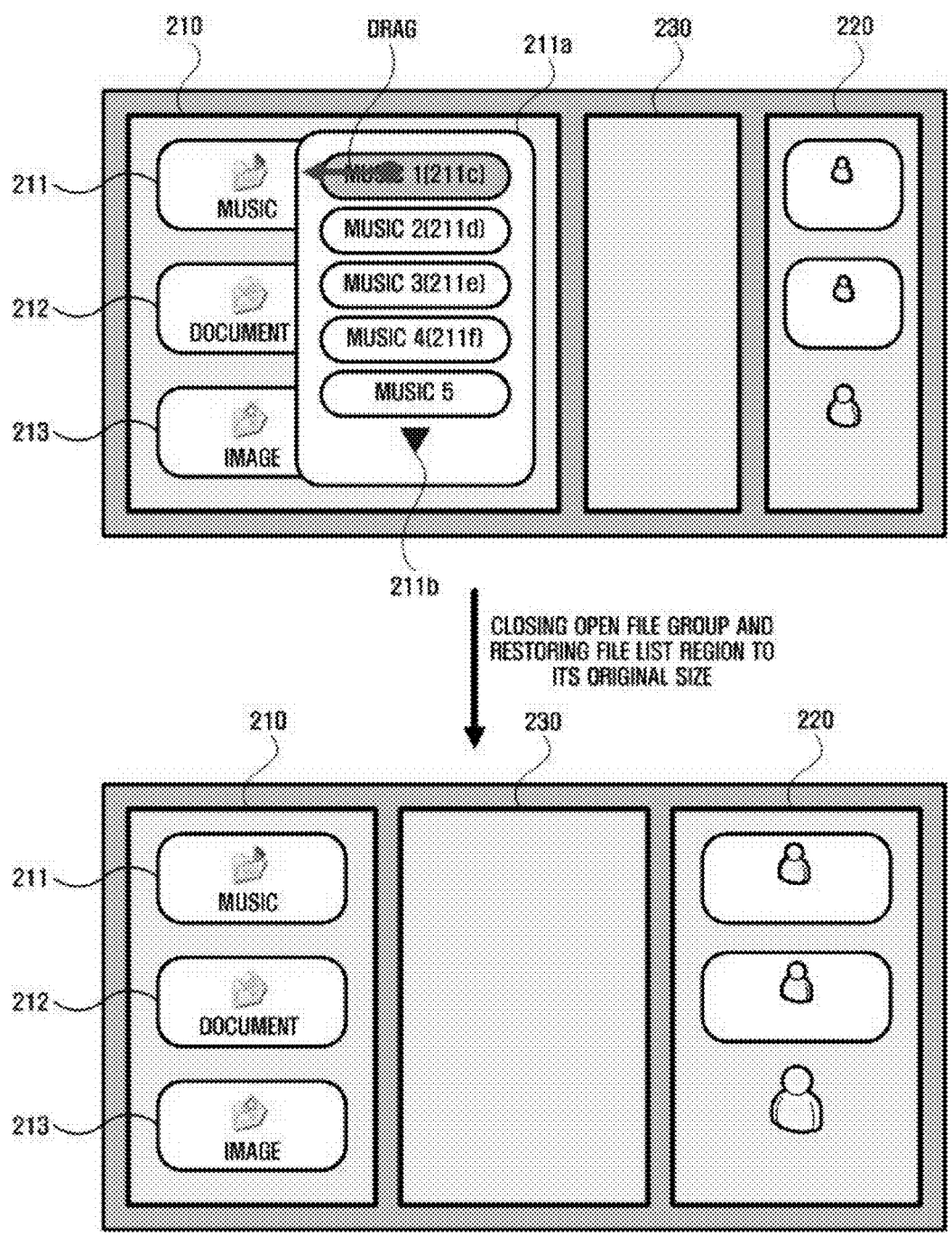
FIG. 5 illustrates an open file group and a method of closing the open file group according to an exemplary embodiment of the present invention

FIG. 5 illustrates an open file group and a method of closing the open file group according to an exemplary embodiment of the present invention.

If a user desires to close a music file group 211 which is in the form of a folder, the user selects any one of a list of music files illustrated in FIG. 5 and drags the select music file to the left as in FIGS. 4A and 4B. Then, the music file group 211 is closed, and the motion execution module 102 restores the file list region 210, which was adjusted to become larger than other regions, to its original size.

The transmission target region 220 displays a list of transmission targets stored in a predetermined repository. The user selects a transmission target by touching it and moves the selected transmission target.

Figure 6A:
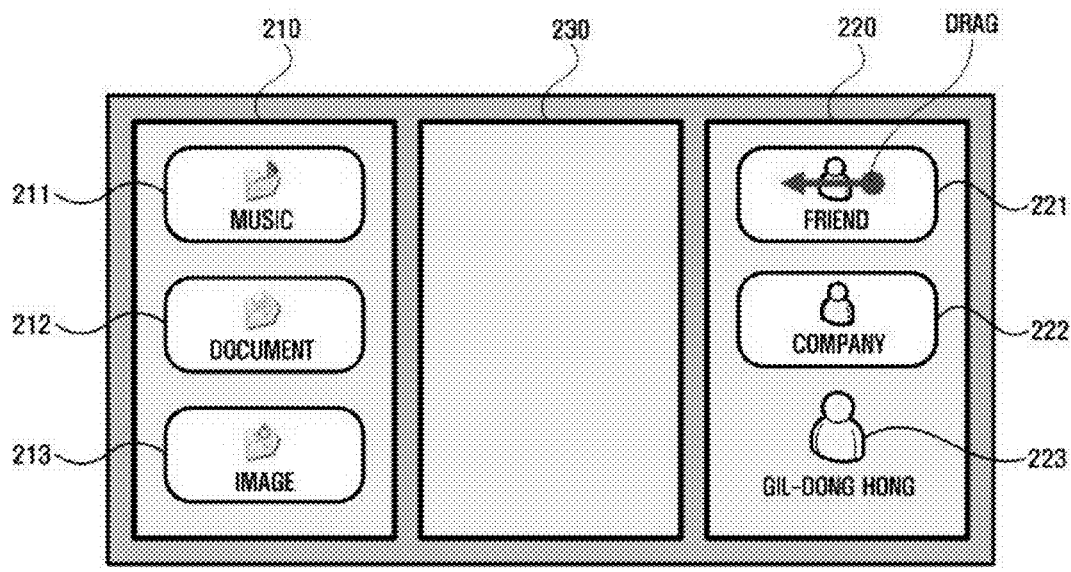
FIGS. 6A through 6C illustrate touch motions in a transmission target region according to an exemplary embodiment of the present invention.
Figure 6:
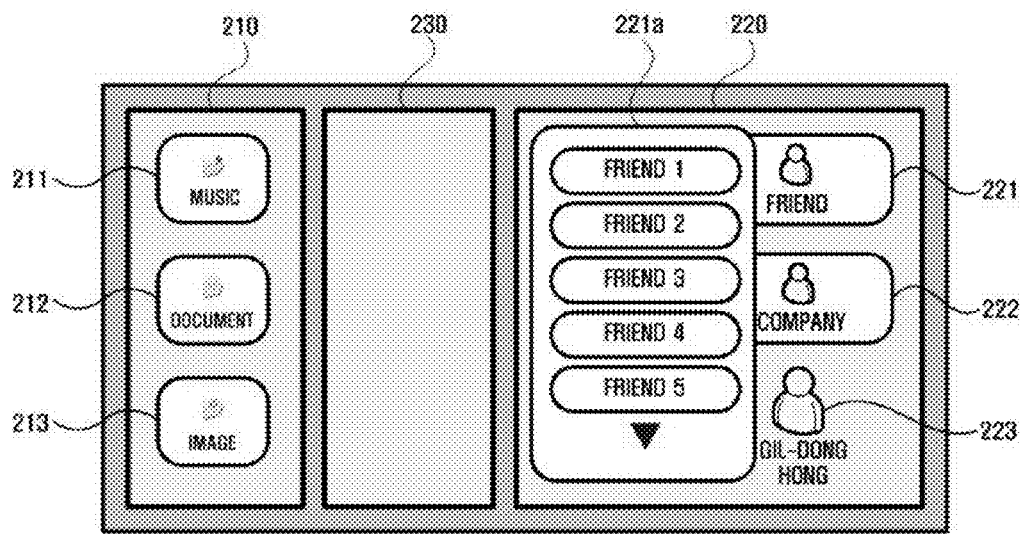
Figure 6:
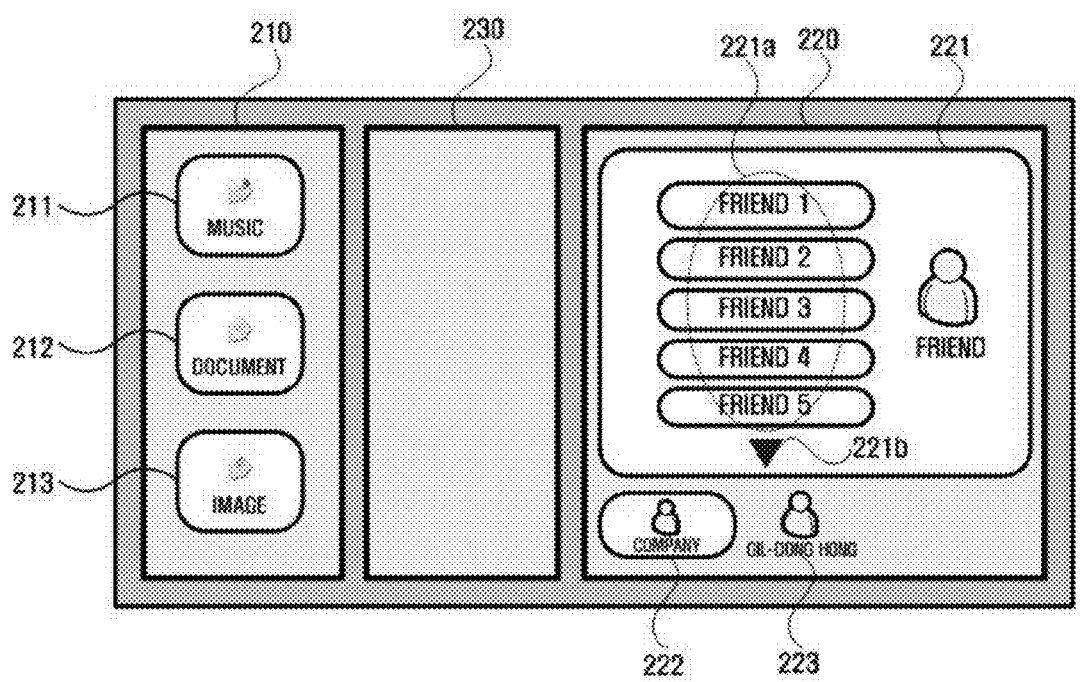

FIGS. 6A through 6C illustrate touch motions in the transmission target region 220 according to an exemplary embodiment of the present invention.

In the present exemplary embodiment, it is assumed that a predetermined repository stores one or more transmission targets, such as telephone numbers and mail addresses, and that the transmission targets are respectively included in a plurality of corresponding transmission target groups, i.e., a friend group 221 and a company group 222, and displayed in the transmission target region 220 in the form of a folder. In addition, it is assumed that a corresponding mobile device is wiredly or wirelessly connected to a transmission target in order to transmit one or more files selected in the file list region 210 to the transmission target.

A transmission target 223, i.e., 'Gil-dong Hong,' illustrated in FIG. 6A is an independent transmission target which is included in neither the friend group 221 nor the company group 222.

In order to select a transmission target, e.g., the friend group 221, from the friend group 221, the company group 222, and the transmission target 223 displayed in the transmission target region 220, the user drags the friend group 221 to the left.

A direction in which the user drags the friend group 221 is not limited to the present exemplary embodiment. However, a function of each motion may have a consistent direction.

The motion perception module 101 perceives a drag motion input by the user, identifies a position of the drag motion, and transmits information regarding an object, which corresponds to the identified position, to the motion execution module 102.

In the 'information regarding an object, which corresponds to the identified position,' the object corresponding to the identified position is the friend group 221, and the information regarding the object denotes information such as the number of transmission targets included in the friend group 211, telephone number of each transmission target, and e-mail addresses.

FIGS. 6B and 6C illustrates a plurality of transmission targets in a transmission target group which are displayed in the form of a list with a drag motion according to an exemplary embodiment of the present invention.

The motion execution module 102 may pop up a plurality of transmission targets 221a in a friend group 221 on the transmission target region 220 as illustrated in FIG. 6B. Alternatively, the motion execution module 102 may display the friend group 221, which is in the form of a folder, in the transmission target region 220 of the display module 103 in the form of a list as illustrated in FIG. 6C.

In this case, the motion execution module 102 adjusts the transmission target region 220 to become larger than other regions so that a user can intuitively perceive that a job is currently being executed in the transmission target region 220.

Hereinafter, popping up a plurality of transmission targets, which are included in a transmission target group, such as the friend group 221, on the transmission target region 220 in the form of a list or displaying the transmission targets in the transmission target region 220 in the form of a list will be expressed as 'opening a transmission target group.' In addition, removing a plurality transmission targets included in an 'open transmission target group' from the transmission target region 220 will be expressed as 'closing a transmission target group.'

If the user desires to transmit only one of the transmission targets 221a displayed in the transmission target region 220, the user touches and thus selects a desired transmission target.

Figure 7A:
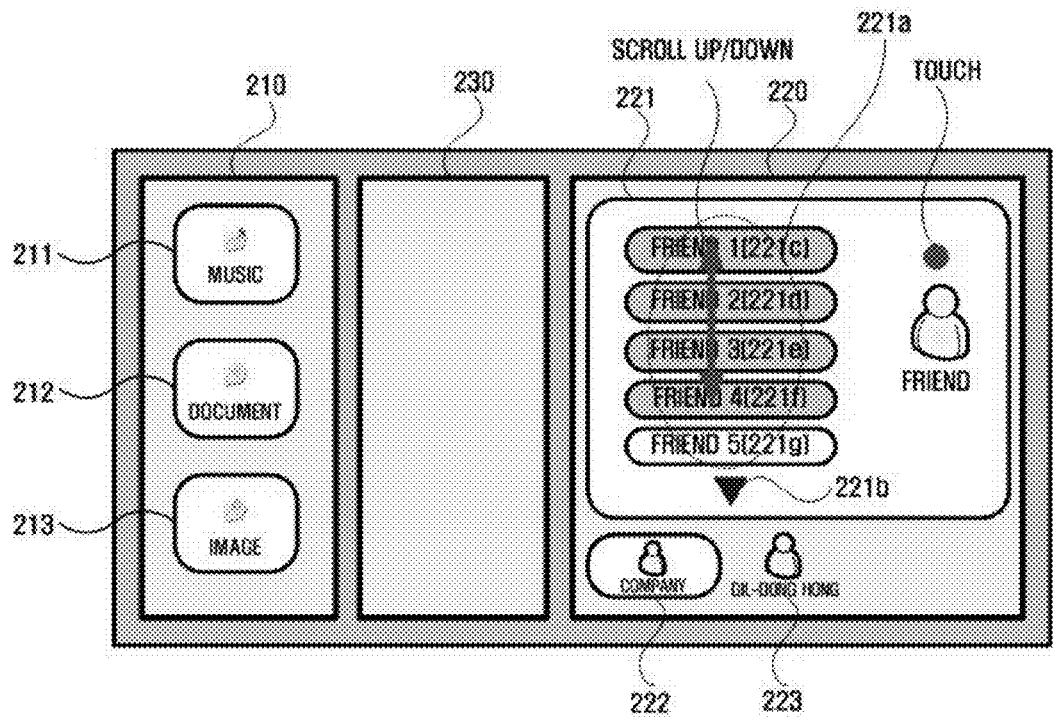
FIGS. 7A through 7C illustrate a method of selecting one or more transmission targets with touch and scroll motions according to an exemplary embodiment of the present invention.
Figure 7:
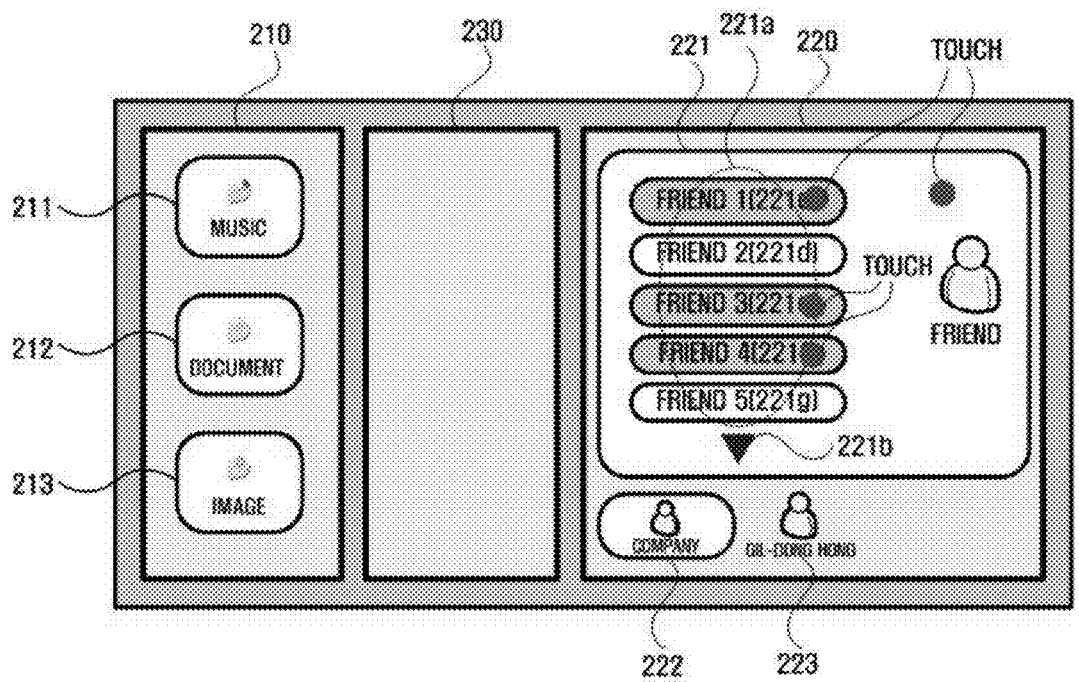
Figure 7:
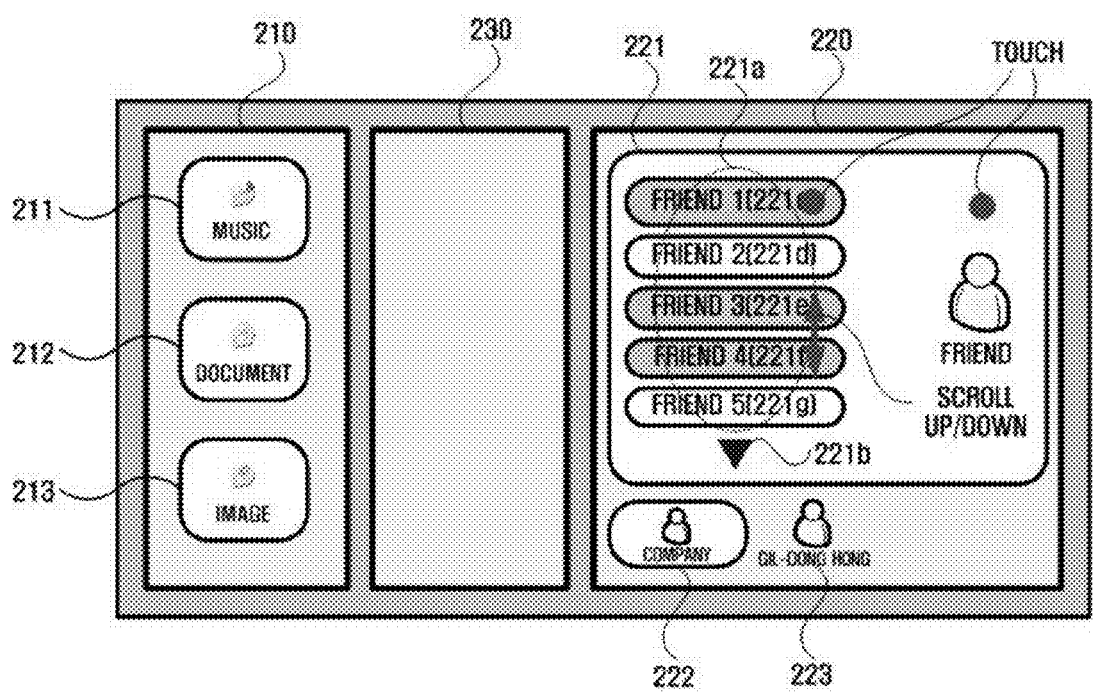

If the user desires to select not just one, but more than one transmission target, the user may make touch and scroll motions as illustrated in FIGS. 7A through 7C.

In order to select one or more transmission targets, an apparatus to which a multi-point touch sensing screen is applied is required. As described above with reference to FIG. 1, it is assumed that a multi-point touch sensing screen is applied to the apparatus 100 in order to select one or more transmission targets.

FIGS. 7A through 7C illustrate a method of selecting one or more transmission targets with touch and scroll motions according to an exemplary embodiment of the present invention.

It is assumed that a plurality of transmission targets 221a in a friend group 221 are displayed in the form of a list in the transmission target region 220 as illustrated in FIG. 6C and that a user selects four consecutive transmission targets, e.g., first through fourth friends 221c through 221f.

In FIG. 7A, in order to select one or more consecutive transmission targets, i.e., the first through fourth friends 221c through 221f, the user touches the first friend 221c, which is an uppermost one of the consecutive transmission targets, with the left hand while touching a position of a corresponding transmission target group, i.e., the friend group 221, with the left hand as described above with reference to FIGS. 4A through 4C. Then, the user scrolls from the first friend 221c to the fourth friend 221f, which is a lowermost one of the consecutive transmission targets, thereby selecting the consecutive transmission targets.

In order to select one or more inconsecutive transmission targets, i.e., the first friend 211c, the third friend 211e and the fourth friend 211f, the user may touch each of the inconsecutive transmission targets with the left hand while touching a corresponding transmission target group, i.e., the friend group 211, with the right hand as illustrated in FIG. 7B. Alternatively, as illustrated in FIG. 7C, the user may touch the first friend 211c. Then, since the third and fourth friends 211e and 211f are consecutive transmission targets, the user may select the third and fourth friends 211e and 211f by scrolling them using a scrolling method described above with reference to FIG. 7A. In this way, the user can select the inconsecutive transmission targets.

Here, the order of the touch and scroll motions is not limited to the present exemplary embodiment. That is, after consecutive transmission targets are scrolled and thus selected, the remaining transmission targets may be touched and thus selected.

Figure 8:
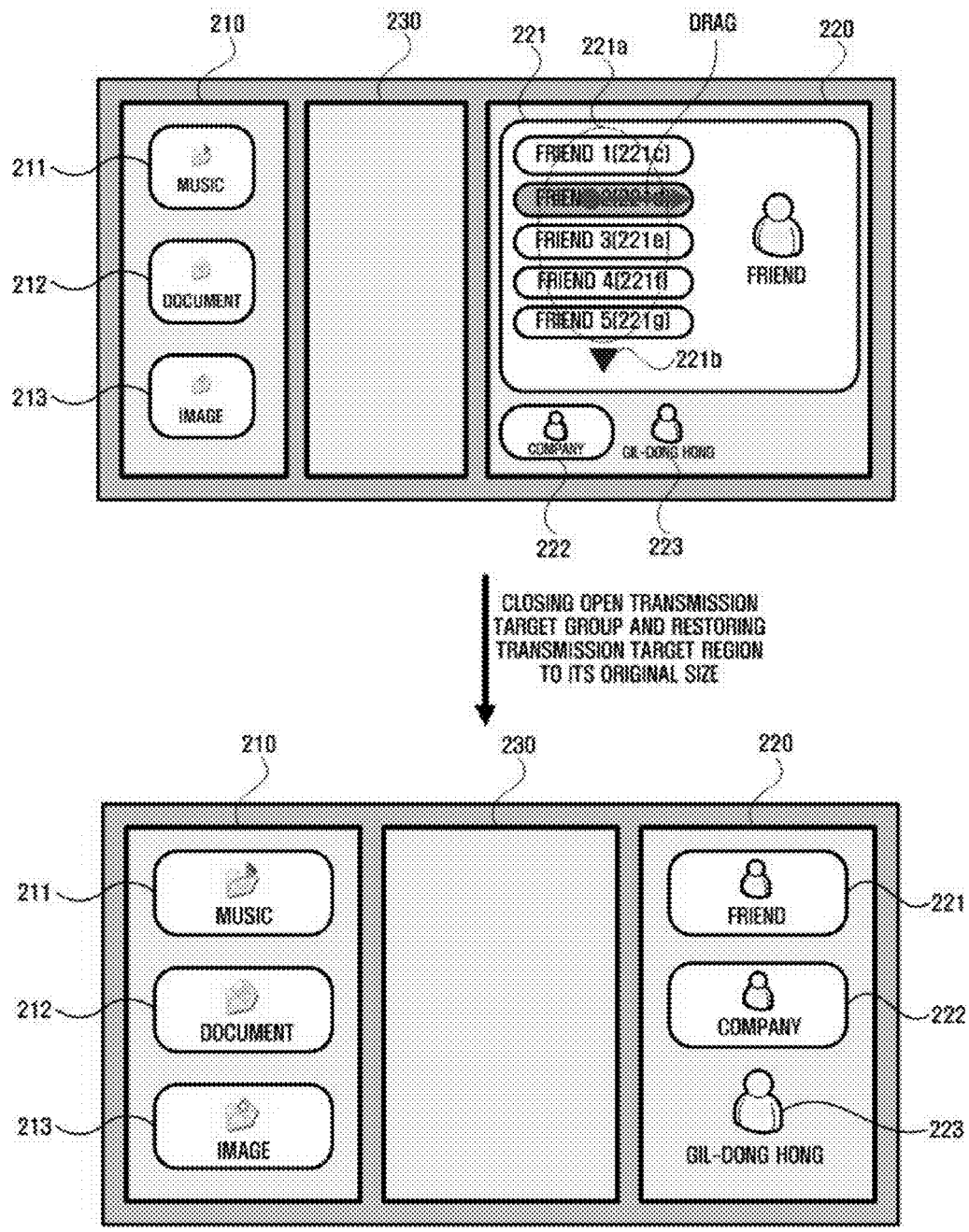
FIG. 8 illustrates an open file group and a method of closing the open file group according to an exemplary embodiment of the present invention.

FIG. 8 illustrates an open file group and a method of closing the open file group according to an exemplary embodiment of the present invention.

If a user desires to close a friend group 221 which is in the form of a folder, the user selects any one of a list of transmission targets 221a illustrated in FIG. 8 and drags the selected transmission target to the right. Then, the friend group 221, which is in the form of a folder, is closed, and the motion execution module 102 restores the transmission target region 220, which was adjusted to become larger than other regions, to its original size.

A file selected in the file list region 210 and a transmission target selected in the transmission target region 220 are moved to the execution region 230, and the selected file is transmitted to the selected transmission target.

Figure 9A:
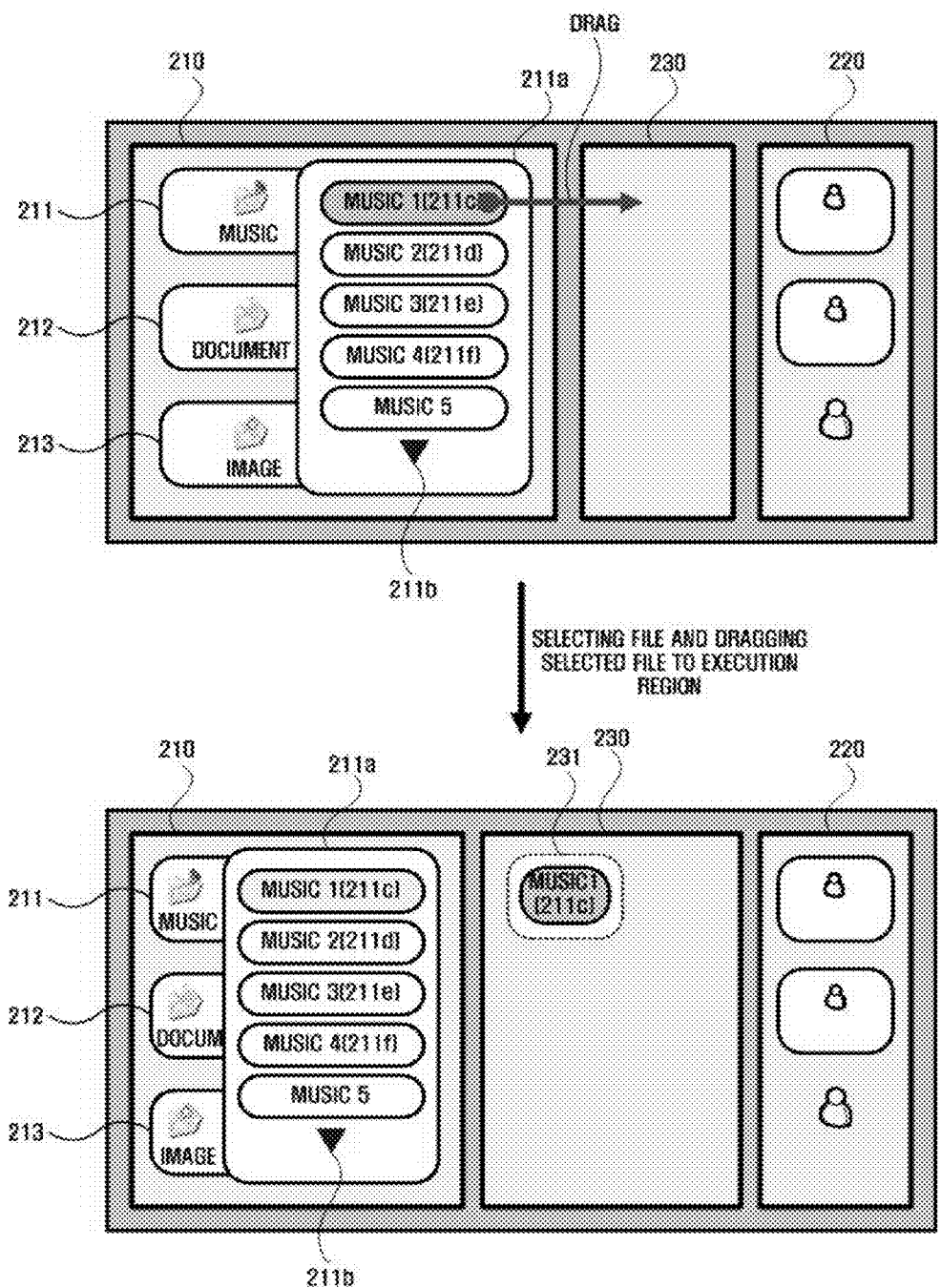
FIGS. 9A through 9C illustrate a method of dragging a file to an execution region according to an exemplary embodiment of the present invention.
Figure 9B:
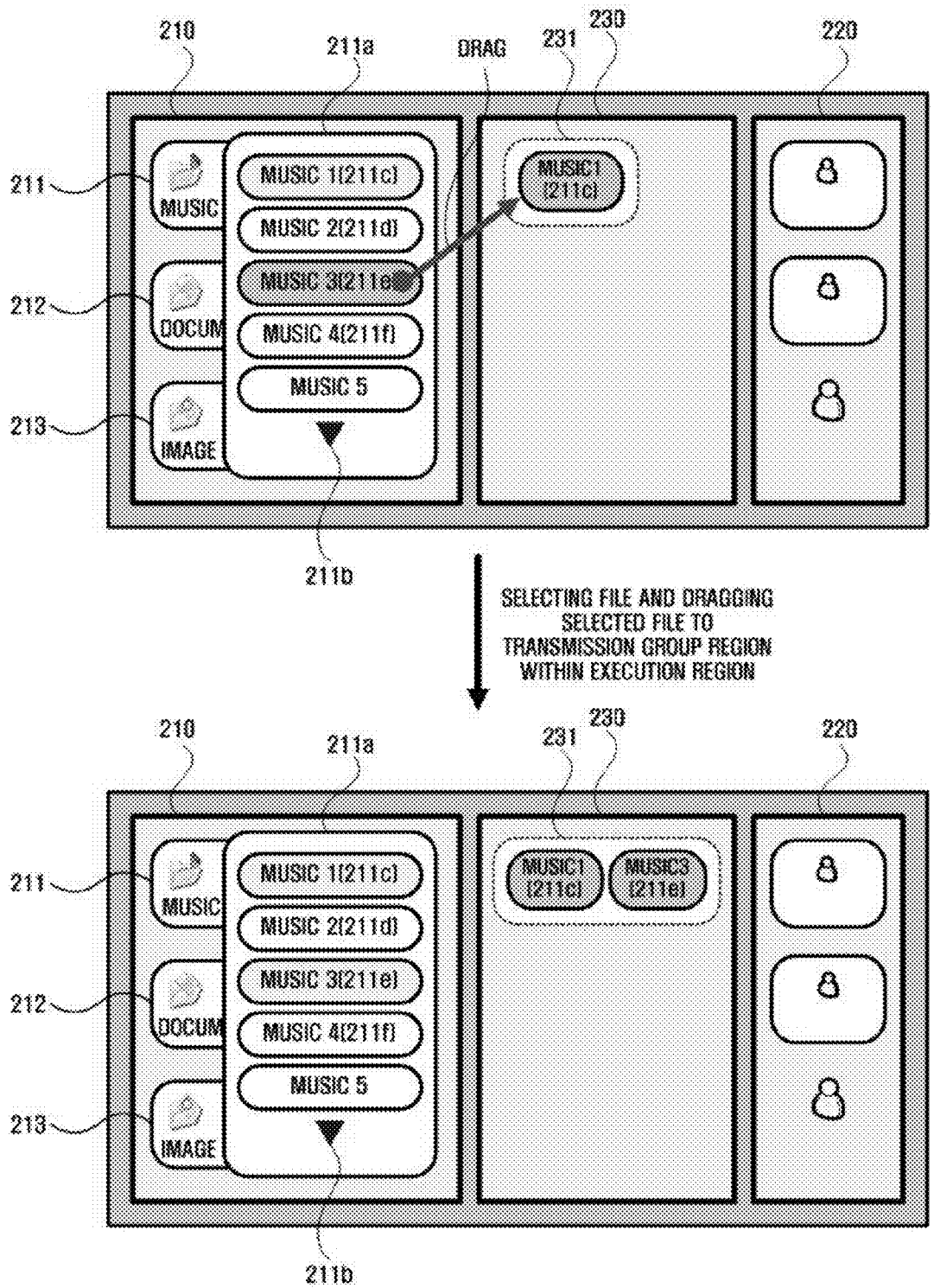
Figure 9C:
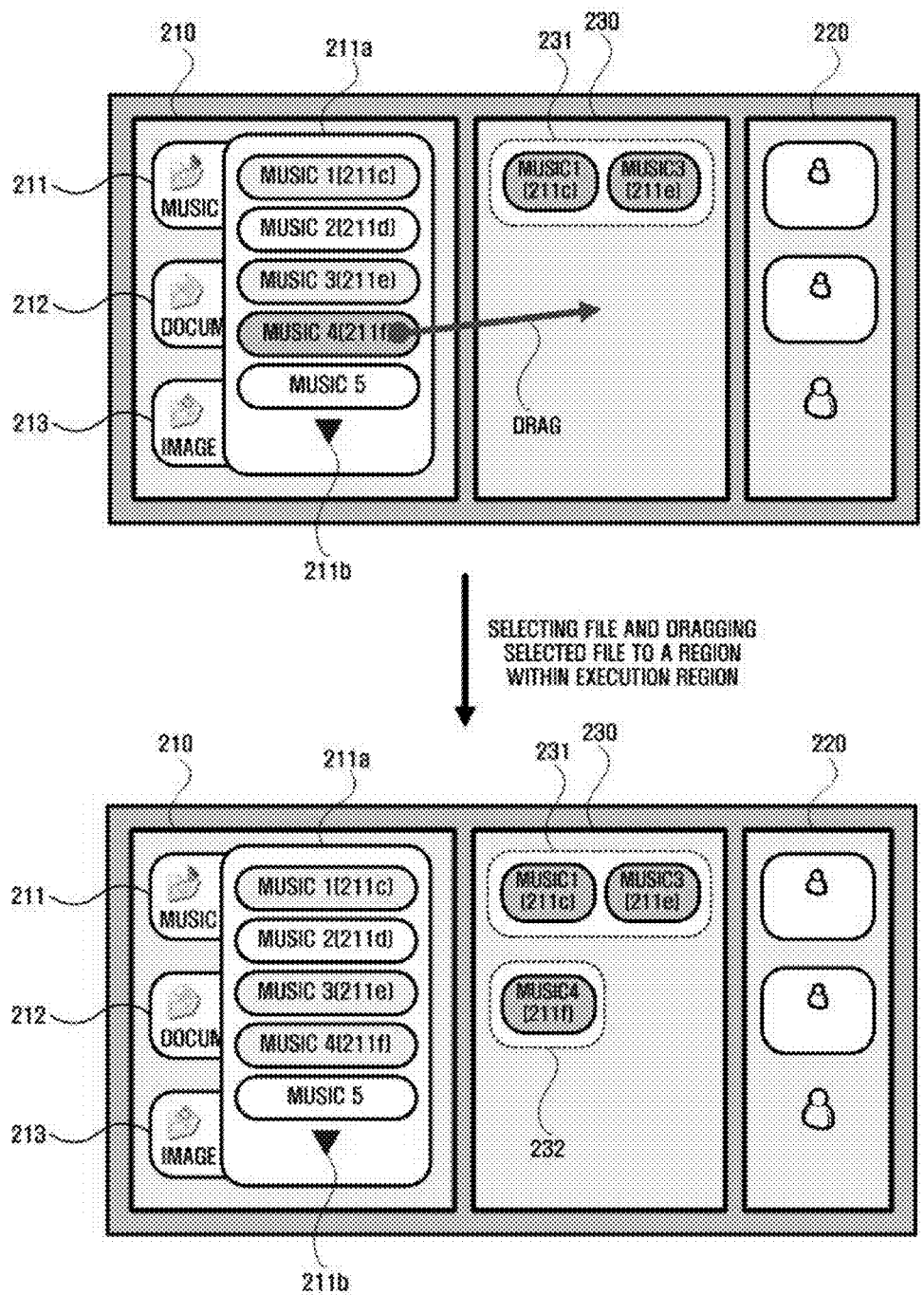

FIGS. 9A through 9C illustrate a method of dragging a file to the execution region 230 according to an exemplary embodiment of the present invention.

A case where a file selected in the file list region 210 is moved to the execution region 230 in order to be transmitted will be described as an example.

Referring to FIG. 9A, a user selects a file 211c from a list of files 211a popped up on the file list region 210 by touching the file 211c and drags the selected file 211c to the execution region 230.

If the selected file 211c is dragged to the execution region 230, a transmission group region 231 is generated within the execution region 230. Then, if the user selects another file 211e in the file list region 210 and drags the selected file 211*e* to the previously generated transmission group region 231 within the execution region 230, the dragged file 211*e* forms one group region together with the previously generated transmission group region 231.

If the user drags the selected file 211*e* to another region instead of the previously generated transmission group region 231, a new transmission group region 232 is generated as illustrated in FIG. 9C.

Similarly, if the user desires to move a plurality of files selected in the file list region 210 to the execution region 230 and transmit them, the user simultaneously drags the selected files to the execution region 230. Then, a transmission group region is generated within the execution region 230.

If the user selects another plurality of files in the file list region 210 and drags them to the previously generated transmission group region within the execution region 230, the dragged files form one group region together with the previously generated transmission group region.

If the user drags the selected files to another region instead of the previously generated transmission group region, a new transmission group region is generated.

FIG. 10 illustrates a method of dragging a transmission target to the execution region 230 according to an exemplary embodiment of the present invention.

When one or more files are transmitted, there may be one or more transmission targets.

As described above with reference to FIGS. 7A through 7C, a user may select one or more desired transmission targets in the transmission target region 220 by touching and dragging them.

For convenience of description, a case where one transmission target is moved to the execution region 230 will be described in FIG. 10.

Referring to FIG. 10, the user selects a second friend 221*d* in the transmission target region 220 as a transmission target and drags the second friend 221*d* to the execution region 230.

If the second friend 221*d* is moved to the execution region 230, a transmission standby group region 233 is generated within the execution region 230.

Then, if the user selects another one or more transmission targets in the transmission target region 220 and drags the selected transmission targets to the previously generated transmission standby group region 233 within the execution region 230, the dragged transmission targets form one group region together with a the previously generated transmission standby group region 233.

If the user drags the selected transmission targets to another region in the execution region 230 instead of the previously generated transmission standby group region 233, a new transmission standby group region is generated.

In this way, one or more transmission group regions and one or more transmission standby group regions can be generated within the execution region 230, and the user may drag a transmission group region to a transmission standby group region, thereby transmitting a file to a transmission target.

Figure 11B:
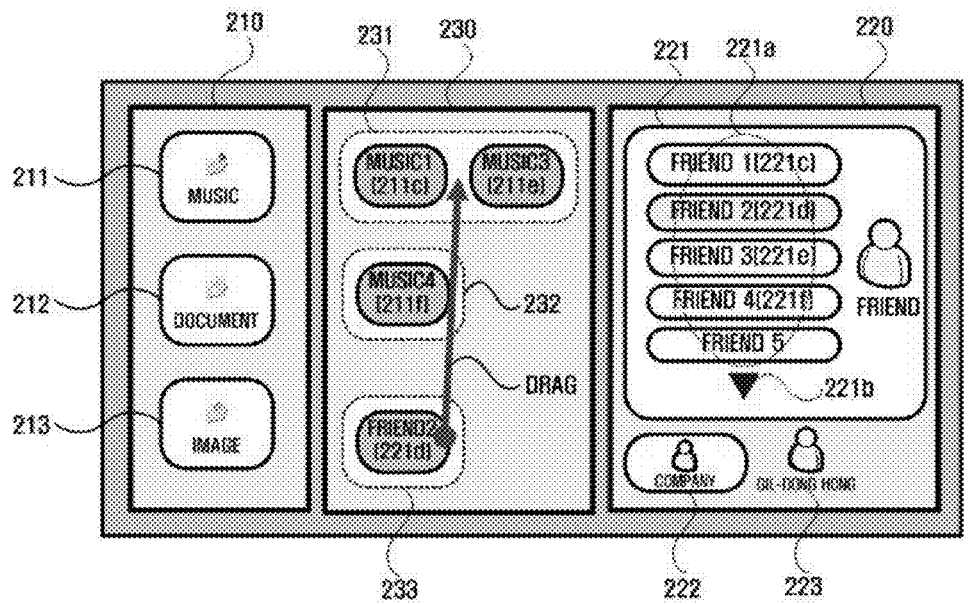
Figure 11C:
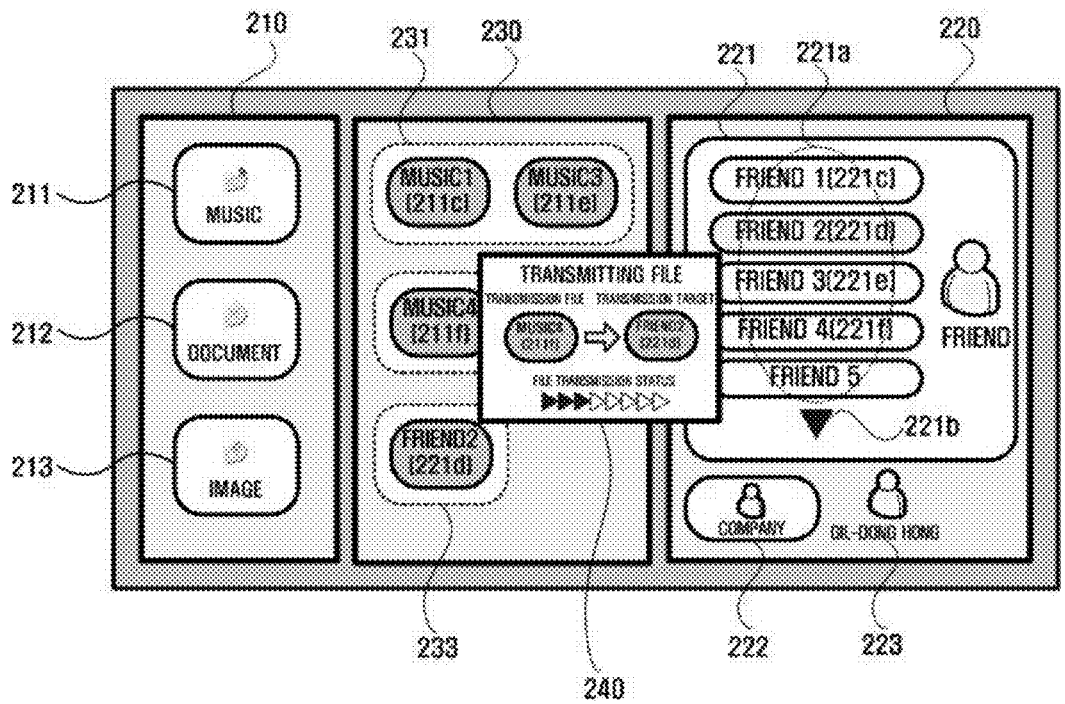

FIGS. 11A through 11C illustrate a method of transmitting a file to a transmission target in the execution region 230 according to an exemplary embodiment of the present invention.

It is assumed that transmission group regions 231 and 232 and a transmission standby group region 233 exist in the execution region 230 and that a user intends to transmit a fourth music file 211*f* to a second friend 221*d*.

Referring to FIG. 11A, the user drags the transmission group region 232 for the fourth music file 211*f* to the transmission standby group region 233 for the second friend 221*d* in a selection region 230.

Here, dragging a desired file to a transmission target is not the only way to transmit the desired file.

As illustrated in FIG. 11B, a transmission target, i.e., the transmission standby group region 233, may be dragged to the transmission group region 231 for a file that is to be transmitted so that the file can be transmitted to the transmission target 233.

The communication module 104 transmits a file dragged by the user to a transmission target through any one of wired and wireless data communication networks connected to the mobile device. The motion execution module 102 displays a screen 240, which shows that the file is being transmitted to the transmission target, using the display module 103, thereby giving a feedback to the user.

The screen 240 fed back to the user visually represents a file and a transmission target dragged respectively from the file list region 210 and the transmission target region 220 to the execution region 230 so that the user can intuitively perceive which file is being transmitted to which transmission target.

If the user desires to remove one or more of transmission files & transmission group regions and transmission targets & transmission standby group regions from the execution region 230, the user may drag desired files and group regions in an external direction of the execution region 230 and thus remove them from the execution region 230.

The external direction denotes a direction from the execution region 230 to the file list region 210 in the case of transmission files and transmission group regions and denotes a direction from the execution region 230 to the transmission target region 220 in the case of transmission targets and transmission standby group regions.

That is, a drag motion into the execution region 230 denotes preparation for file transmission, and a drag motion out of the execution region 230 denotes cancellation of file transmission.

In addition, a drag direction for opening a group in the form of a folder and displaying files in the group in the form of a list in the file list region 210 is from the file list region 210 to the execution region 230. A drag direction for placing the files, which are displayed in the form of a list, back in the group in the form of a folder is from the execution region 230 to the file list region 210.

Similarly, a drag direction for opening a group in the form of a folder and displaying transmission targets in the group in the form of a list in the transmission target region 220 is from the transmission target region 220 to the execution region 230. A drag direction for placing the transmission targets, which are displayed in the form of a list, back in the group in the form of a folder is from the execution region 230 to the transmission target region 220.

Since the configuration of a screen region according to the present exemplary embodiment gives consistency to the drag direction, a user can easily perceive whether a job will be continued or cancelled based on a drag direction from the execution region 230.

Figure 12:
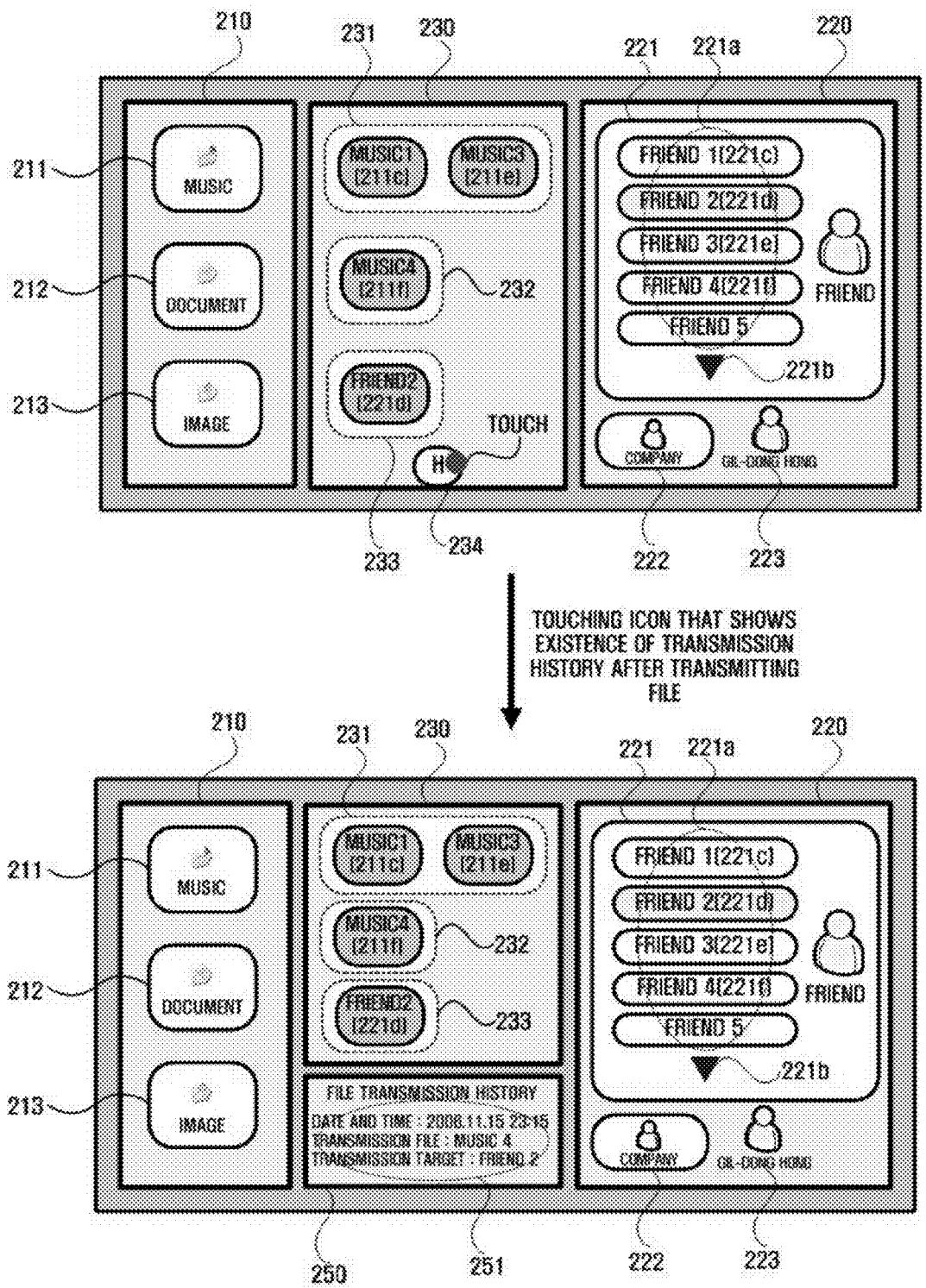
FIG. 12 illustrates a file transmission history region according to an exemplary embodiment of the present invention.

FIG. 12 illustrates a file transmission history region 250 according to an exemplary embodiment of the present invention.

If a file is transmitted to a transmission target, the motion execution module 102 displays information 251 regarding the transmitted file and the transmission target in the file transmission history region 250 of the display module 103.

The file transmission history region 250 displays the information 251 for a predetermined period or period of time. If a user set the file transmission history region 250 to be displayed together with the execution region 230, the information 251 and the execution region 230 may be displayed together. Alternatively, an icon 234 may be formed at a predetermined position so that the file transmission history region 250 can be displayed only when it is required to retrieve a file transmission history. Therefore, if the user touches the icon 234, the file transmission history region 250 may be displayed.

If the file transmission history region 250 is displayed, the motion execution module 102 reduces the size of the execution region 230 by the size of the file transmission history region 250 displayed on the screen of the mobile device.

Since the user also can adjust the size of each region with a scroll motion, the present invention is not limited to adjusting the size of each displayed region using the motion execution module 102.

Figure 13:
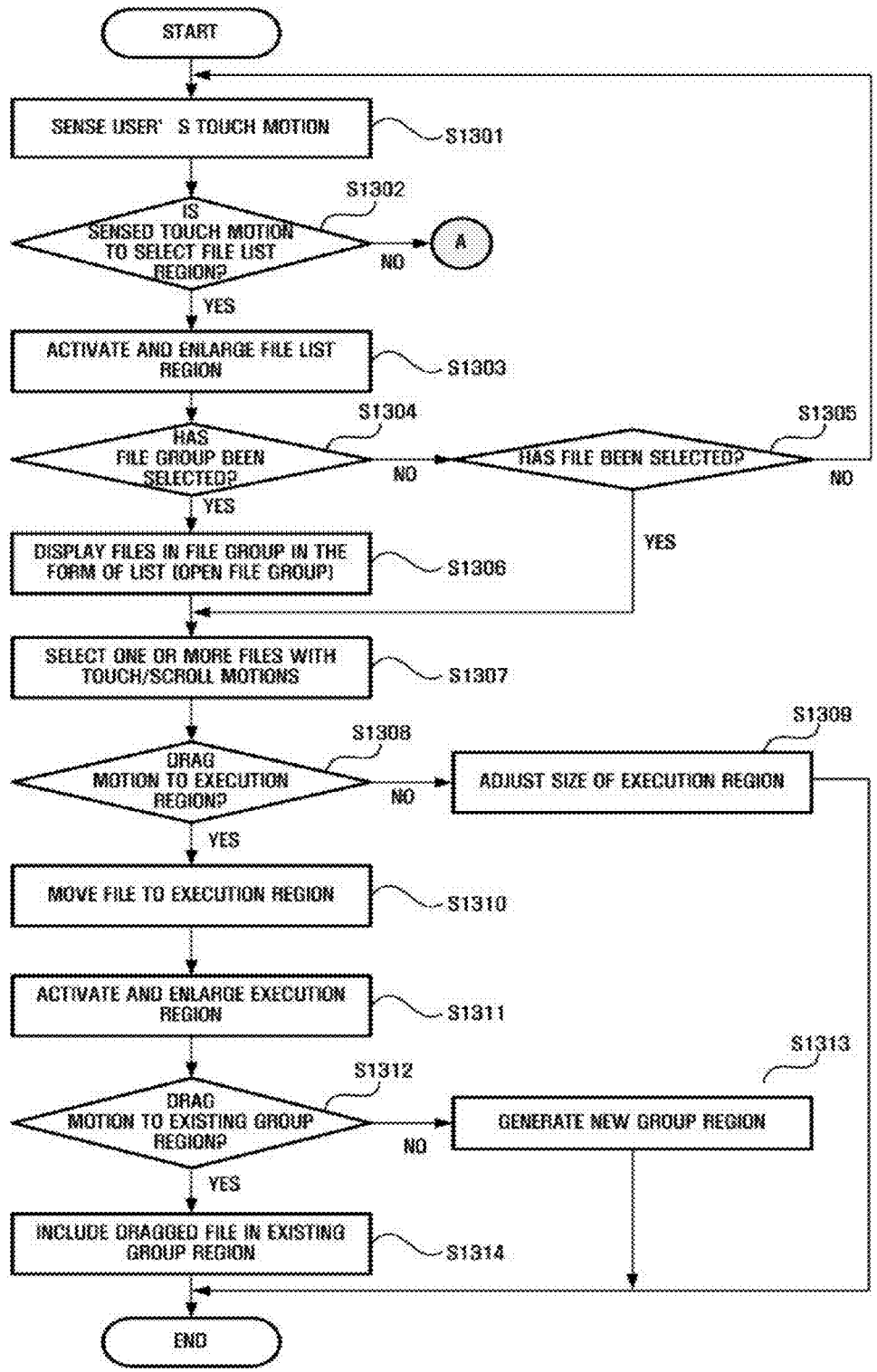
FIG. 13 is a flowchart illustrating a method of transmitting a file with a touch motion in the file list region according to an exemplary embodiment of the present invention.

FIG. 13 is a flowchart illustrating a method of transmitting a file with a touch motion in the file list region 210 according to an exemplary embodiment of the present invention.

If a user's touch motion is input, the motion perception module 101 senses the input touch motion (operation S1301) and determines whether the sensed touch motion is to select the file list region 210 (operation S1302).

If the motion perception module 101 determines that the sensed touch motion is to select the file list region 210, the motion execution module 102 activates the file list region 210 touched by the user and adjusts the file list region 210 to become larger than other regions (operation S1303).

A case where the motion perception module 101 determines in operation S1302 that the sensed touch motion is not to select the file list region 210 will be described in detail later with reference to FIGS. 14 and 15.

After operation S1303, if the user's another touch motion is input, the motion perception module 101 determines whether the input touch motion is to select a file group (operation S1304).

If the motion perception module 101 determines that the input touch motion is not to select the file group, the motion execution module 102 determines whether the input touch motion is to select a file (operation S1305).

If the motion perception module 101 determines in operation S1305 that the input touch motion is not to select the file, that is, the input touch motion is to select neither the file group nor the file, the motion perception module 101 determines that the user has touched a blank space and repeats operation S1301.

If the motion perception module 101 determines in operation S1304 that the input touch motion is to select the file group, the motion execution module 102 displays a plurality of files in the file group in the form of a list in the file list region 210 of the display module 103, that is, opens the file group (operation S1306).

If the motion perception module 101 determines in operation S1305 that the input touch motion is to select the file or after operation S1306, the user selects one or more files (operation S1307).

After operation S1307, if the user's another touch motion is input, the motion perception module 101 determines whether the input touch motion is a drag motion to the execution region 230 (operation S1308).

If the motion perception module 101 determines in operation S1308 that the input touch motion is not the drag motion to the execution region 230, that is, a drag motion from the file list region 210 to the execution region, the motion execution module 102 restores the file list region 210 to its original size (operation S1309).

If one or more files in the open file group are dragged from the execution region 230 to the file list region 210, the motion execution module 102 closes the file group and then adjusts the size of the file list region 210.

If the motion perception module 101 determines in operation S1308 that the input touch motion is the drag motion to the execution region 230, the motion execution module 102 moves a corresponding file from the file list region 210 to the execution region 230 (operation S1310).

After operation S1310, the motion execution module 102 activates the execution region 230 to which the file has been dragged by the user and adjusts the execution region 230 to become wider than the file list region 210 (operation S1311).

After operation S1311, if the user's another touch motion is input, the motion perception module 101 determines whether the input touch motion is a drag motion to an existing file group region (operation S1312).

If the motion perception module 101 determines that the input touch motion is not the drag motion to the existing file group region, the motion execution module 102 generates a separate file group region for the dragged file and displays the generated file group region at a predetermined position of the execution region 230 of the display module 103 (operation S1313).

If the motion perception module 101 determines in operation S1312 that the input touch motion is the drag motion to the existing file group region, the motion execution module 102 includes the dragged file in the existing file group region and displays it accordingly in the execution region 230 of the display module 103 (operation S1314).

Figure 14:
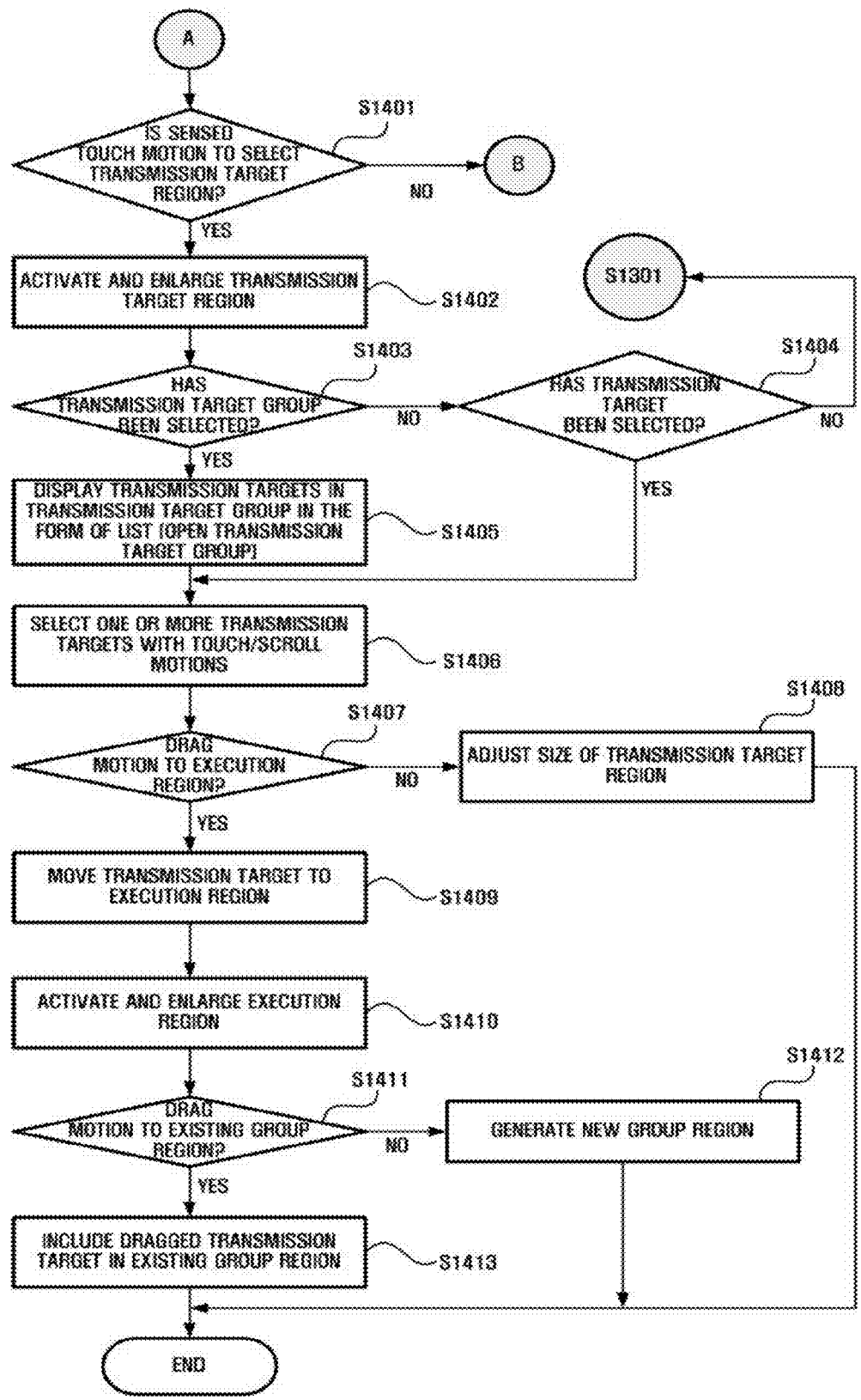
FIG. 14 is a flowchart illustrating a method of transmitting a file with a touch motion in the transmission target region according to an exemplary embodiment of the present invention.

FIG. 14 is a flowchart illustrating a method of transmitting a file with a touch motion in the transmission target region 220 according to an exemplary embodiment of the present invention.

If a user's touch motion is input, the motion perception module 101 senses the input touch motion and determines whether the sensed touch motion is to select the transmission target region 220 (operation S1401).

If the motion perception module 101 determines that the sensed touch motion is to select the transmission target region 220, the motion execution module 102 activates the transmission target region 220 touched by the user and adjusts the file list region 210 to become wider than other regions (operation S1402).

A case where the motion perception module 101 determines in operation S1402 that the sensed touch motion is not to select the transmission target region 220 will be described in detail later with reference to FIG. 15.

After operation S1402, if the user's another touch motion is input, the motion perception module 101 determines whether the input touch motion is to select a transmission target group (operation S1403).

If determining that the input touch motion is not to select the transmission target group, the motion perception module 101 determines whether the input touch motion is to select a transmission target (operation S1404).

If the motion perception module 101 determines in operation S1404 that the input touch motion is not to select the transmission target, that is, the input touch motion in the transmission target region 220 is to select neither the transmission target group nor the transmission target, the motion perception module 101 determines that the user has touched a blank space and repeats operation S1401.

If the motion perception module 101 determines in operation S1403 that the input touch motion is to select the transmission target group, the motion execution module 102 displays a plurality of transmission targets in the transmission target group in the form of a list in the transmission target region 220 of the display module 103, that is, opens the transmission target group (operation S1405).

If the motion perception module 101 determines in operation S1404 that the input touch motion is to select the transmission target or after operation S1405, the user selects one or more transmission targets (operation S1406).

After operation S1406, if the user's another touch motion is input, the motion perception module 101 determines whether the input touch motion is a drag motion to the execution region 230 (operation S1407).

If the motion perception module 101 determines that the input touch motion is not the drag motion to the execution region 230, that is, a drag motion from the transmission target region 220 to the execution region 230, the motion execution module 102 restores the transmission target region 220 to its original size (operation S1408).

If one or more transmission targets in the open transmission target group are dragged from the execution region 230 to the transmission target region 220, the motion execution module 102 closes the transmission target group and then adjusts the size of the transmission target region 220.

If the motion perception module 101 determines in operation S1407 that the input touch motion is the drag motion to the execution region 230, the motion execution module 102 moves a corresponding transmission target from the transmission target region 220 to the execution region 230 (operation S1409).

After operation S1409, the motion execution module 102 activates the execution region 230 to which the transmission target has been dragged by the user and adjusts the execution region 230 to become wider than the transmission target region 220 (operation S1410).

After operation S1410, if the user's another touch motion is input, the motion perception module 101 determines whether the input touch motion is a drag motion to an existing transmission target group region (operation S1411).

If the motion perception module 101 determines that the input touch motion is not the drag motion to the existing transmission target group region, the motion execution module 102 generates a separate transmission target group region for the dragged transmission target and displays the generated transmission target group region at a predetermined position of the execution region 230 of the display module 103 (operation S1412).

If the motion perception module 101 determines in operation S1411 that the input touch motion is the drag motion to the existing transmission target group region, the motion execution module 102 includes the dragged transmission target in the existing transmission target group region and displays it accordingly in the execution region 230 of the display module 103 (operation S1413).

Figure 15:
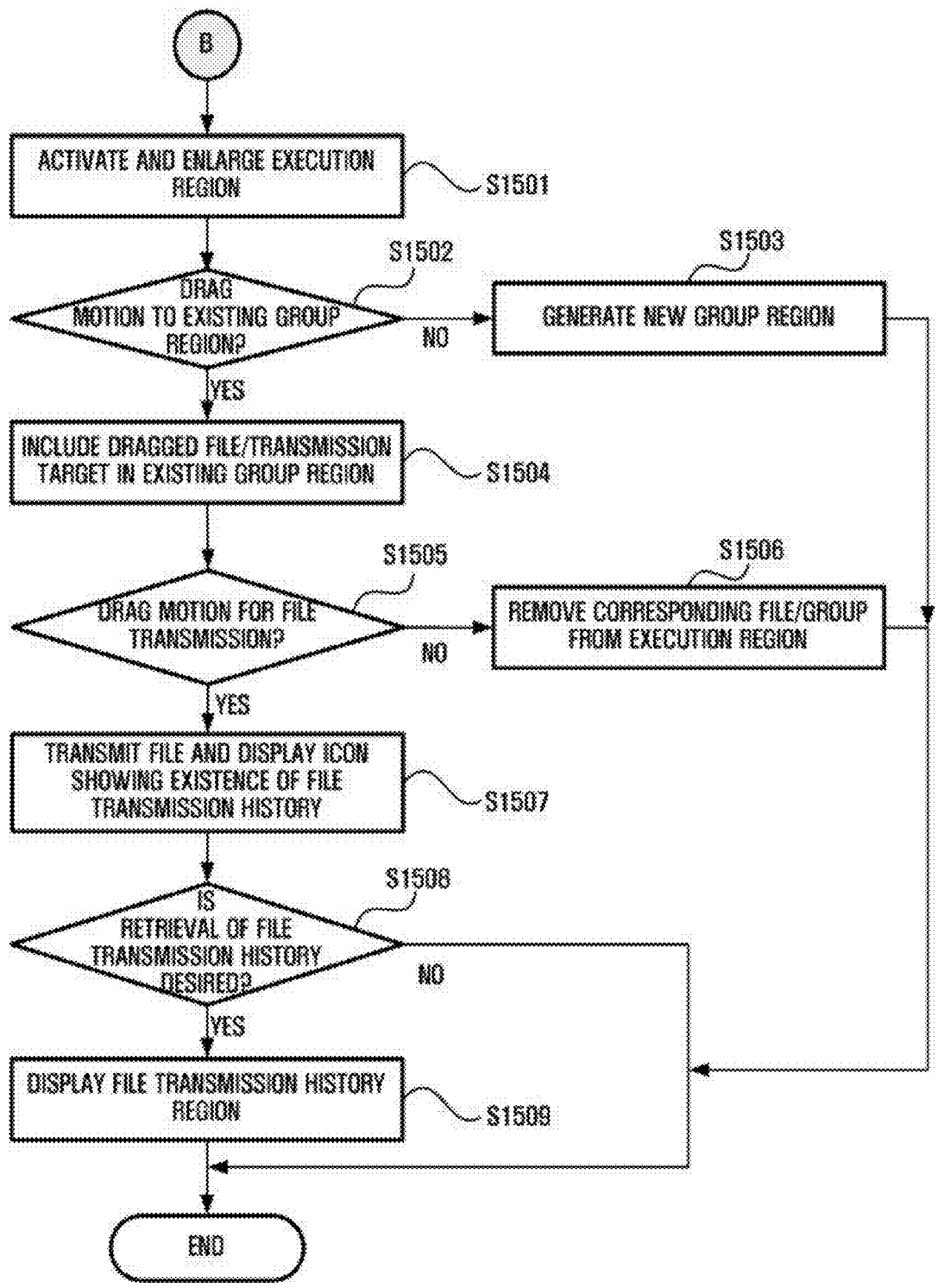
FIG. 15 is a flowchart illustrating a method of transmitting a file with a touch motion in the execution region according to an exemplary embodiment of the present invention.

FIG. 15 is a flowchart illustrating a method of transmitting a file with a touch motion in the execution region 230 according to an exemplary embodiment of the present invention.

For convenience of description, it is assumed that a file group and a transmission target group are dragged to the execution region 230 in the operations illustrated in FIGS. 13 and 14.

If a user's touch motion is input, the motion execution module 102 activates the execution region 230 touched by the user and adjusts the transmission target region 220 to become wider than other regions (operation S1501).

After operation S1501, if the user's another touch motion is input, the motion perception module 101 determines whether the input touch motion is a drag motion to an existing group region (operation S1502).

If the motion perception module 101 determines that the input touch motion is not the drag motion to the existing group region, the motion execution module 102 generates a separate group region for a dragged file or transmission target and displays the generated group region at a predetermined position of the execution region 230 of the display module 103 (operation S1503).

If the motion perception module 101 determines in operation S1502 that the input touch motion is the drag motion to the existing group region, the motion execution module 102 includes the dragged file or transmission target in the existing group region and displays it accordingly in the execution region 230 of the display module 103 (operation S1504).

After operation S1504, if the user's another touch motion is input, the motion perception module 101 determines whether the input touch motion is a drag motion for file transmission (operation S1505).

If the motion perception module 101 determines that the input touch motion is not the drag motion for file transmission, that is, if any one of the file group and the transmission target group is not dragged to the region of the other group, the motion execution module 102 removes the group from the execution region 230 (operation S1506).

If the motion perception module 101 determines that the input touch motion is the drag motion for file transmission, that is, if any one of the file group and the transmission target group is dragged to the region of the other group, the communication module 104 transmits the file to the transmission target, and an icon indicating the existence of a file transmission history is displayed at a predetermined position of the execution region 230 (operation S1507).

After operation S1507, if the user desires to retrieve the file transmission history and thus touches the icon displayed in operation S1507 (operation S1508), the motion execution module 102 displays the file transmission history including a file transmission time, the name of the transmitted file, and the transmission target in the file transmission history region 250 of the display module 103 (operation S1509).

As described above, a screen configuration and manipulation method for file transmission according to the present invention provide at least one of the following advantages.

Since intuitive screen configuration is provided to a user, a mistake made while performing touch and drag motions can be prevented. In addition, one or more files can be easily and conveniently transmitted to one or more transmission targets.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CO-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of the present invention, or they may be of the kind well-known and available to those skilled in the art of computer hardware and/or computer software.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for providing a user interface, comprising:
    a display; and
    a processor configured to display the user interface on the display,
    wherein the user interface comprises:
    a file list region receiving an input of a first selection command for a target file serving as a transmission target from a user;
    a transmission target region receiving an input of a second selection command for a receiving party of the target file; and
    an execution region receiving an input of a transmission command for transmitting the target file to the receiving party,
    wherein the first selection command, the second selection command and the transmission command are generated according to results of tracking a location on the user interface selected by the user, and
    wherein tracking the location includes moving the target file from the file list region to the execution region and moving the receiving party from the transmission target region to the execution region.

2. The apparatus of claim 1, wherein in the file list region, a group of the target file is displayed according to the first selection command.

3. The apparatus of claim 2, wherein in the file list region, when the displayed group is selected, files included in the displayed group are displayed.

4. The apparatus of claim 3, wherein the first selection command is inputted by one or more motions of touch, drag, and scroll motions in the file list region, and at least one file is selected through the first selection command.

5. The apparatus of claim 1, wherein in the transmission target region, a group of the receiving party is displayed according to the second selection command.

6. The apparatus of claim 5, wherein in the transmission target region, when the displayed group is selected, receiving parties included in the displayed group are displayed.

7. The apparatus of claim 3, wherein the second selection command is inputted by one or more motions of touch, drag, and scroll motions in the transmission target region, and at least one receiving party is selected through the second selection command.

8. The apparatus of claim 1, wherein in the execution region, the target file selected according to the first selection command of the file list region is managed in a group.

9. The apparatus of claim 1, wherein in the execution region, the receiving party selected according to the second selection command of the transmission target region is managed in a group.

10. The apparatus of claim 1, further comprising a file transmission history region displaying a history of the transmitted target file and the receiving party.

11. A method for providing a user interface, comprising:
    receiving an input of a first selection command for a target file serving as a transmission target from a user;
    receiving an input of a second selection command for a receiving party of the target file; and
    receiving an input of a transmission command for transmitting the target file to the receiving party,
    wherein the first selection command, the second selection command and the transmission command are generated according to results of tracking a location on the user interface selected by the user, and wherein tracking the location includes moving the target file from a file list region to an execution region and moving the receiving party from a transmission target region to the execution region.

12. The method of claim 11, wherein a group of the target file is displayed according to the first selection command.

13. The method of claim 12, wherein when the displayed group is selected, files included in the displayed group are displayed.

14. The method of claim 13, wherein the first selection command is inputted by one or more motions of touch, drag, and scroll motions, and at least one file is selected through the first selection command.

15. The method of claim 11, wherein a group of the receiving party is displayed according to the second selection command.

16. The method of claim 15, wherein when the displayed group is selected, receiving parties included in the displayed group are displayed.

17. The method of claim 16, wherein the second selection command is inputted by one or more motions of touch, drag, and scroll motions, and at least one receiving party is selected through the second selection command.

18. The method of claim 11, further comprising displaying a history of the transmitted target file and the receiving party.

19. The method of claim 11, wherein in the execution region, the receiving party selected according to the second selection command of the transmission target region is managed in a group.

* * * * *